US 6,637,194 B2

(12) United States Patent
Kakuyama et al.

(10) Patent No.: US 6,637,194 B2
(45) Date of Patent: Oct. 28, 2003

(54) EXHAUST EMISSION CONTROL FOR ENGINE

(75) Inventors: Masatomo Kakuyama, Yokohama (JP); Shigeaki Kakizaki, Yokohama (JP); Osamu Matsuno, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 124 days.

(21) Appl. No.: 09/958,842

(22) PCT Filed: Feb. 16, 2001

(86) PCT No.: PCT/JP01/01107
§ 371 (c)(1),
(2), (4) Date: Oct. 15, 2001

(87) PCT Pub. No.: WO01/61165
PCT Pub. Date: Aug. 23, 2001

(65) Prior Publication Data
US 2002/0157379 A1 Oct. 31, 2002

(30) Foreign Application Priority Data

Feb. 16, 2000 (JP) .................................... 2000-038677

(51) Int. Cl.⁷ ............................................... F01N 3/00
(52) U.S. Cl. ........................... 60/285; 60/274; 60/276; 60/277
(58) Field of Search .................. 60/274, 276, 277, 60/285, 299; 123/674

(56) References Cited

U.S. PATENT DOCUMENTS

| 5,293,740 A | | 3/1994 | Heppner et al. ............... 60/274 |
| 5,335,538 A | * | 8/1994 | Blischke et al. ............. 73/118.1 |
| 5,414,996 A | | 5/1995 | Sawada et al. ................ 60/277 |
| 5,487,269 A | * | 1/1996 | Atanasyan et al. ............ 60/274 |
| 5,661,972 A | * | 9/1997 | Katoh et al. .................. 60/276 |
| 5,678,402 A | | 10/1997 | Kitagawa et al. .............. 60/276 |
| 5,842,339 A | * | 12/1998 | Bush et al. .................... 60/274 |
| 5,842,340 A | | 12/1998 | Bush et al. .................... 60/274 |
| 6,116,021 A | | 9/2000 | Schumacher et al. ......... 60/274 |
| 6,289,673 B1 | | 9/2001 | Tayama et al. ................ 60/285 |

FOREIGN PATENT DOCUMENTS

| EP | 0 466 311 A1 | 1/1992 |
| JP | 5-195842 | 8/1993 |
| JP | 7-259602 | 10/1995 |
| JP | 9-222010 | 8/1997 |
| WO | 98/38415 | 9/1998 |

* cited by examiner

*Primary Examiner*—Thomas Denion
*Assistant Examiner*—Diem Tran
(74) *Attorney, Agent, or Firm*—Foley & Lardner

(57) ABSTRACT

An engine exhaust emission control arrangement has a catalytic converter including a three-way catalyst. A first oxygen sensor detects an oxygen concentration of exhaust gas upstream of the catalyst and a second oxygen sensor detects an oxygen concentration of exhaust gas downstream of the catalyst. A microprocessor calculates a specific period oxygen storage amount of a catalyst while the upstream oxygen concentration is higher than the stoichiometric concentration and the downstream oxygen concentration is in a predetermined concentration range which has a value approximately equal to the stoichiometric oxygen concentration. The microprocessor also calculates a specific period oxygen release amount of a catalyst while the upstream oxygen concentration is lower than the stoichiometric concentration and the downstream oxygen concentration produces an indication of a predetermined concentration range. A specific period oxygen storage amount is sampled at a time at which the downstream oxygen concentration becomes greater than the predetermined concentration range as a maximum oxygen storage amount and a specific period oxygen release amount is sampled at a time at which the downstream oxygen concentration becomes smaller than the predetermined concentration range as a maximum oxygen release amount. The engine air-fuel ratio is controlled to cause the oxygen storage amount of the catalyst to coincide with a target value which is set at approximately half of an average value of the maximum oxygen storage amount and the maximum oxygen release amount.

28 Claims, 22 Drawing Sheets

3 UNIVERSAL EXHAUST GAS OXYGEN SENSOR
4 CRANK ANGLE SENSOR
6 AIRFLOW METER
11 WATER TEMPERATURE SENSOR
12 CATALYST TEMPERATURE SENSOR
13 OXYGEN SENSOR

3 UNIVERSAL EXHAUST GAS OXYGEN SENSOR
4 CRANK ANGLE SENSOR
6 AIRFLOW METER
11 WATER TEMPERATURE SENSOR
12 CATALYST TEMPERATURE SENSOR
13 OXYGEN SENSOR

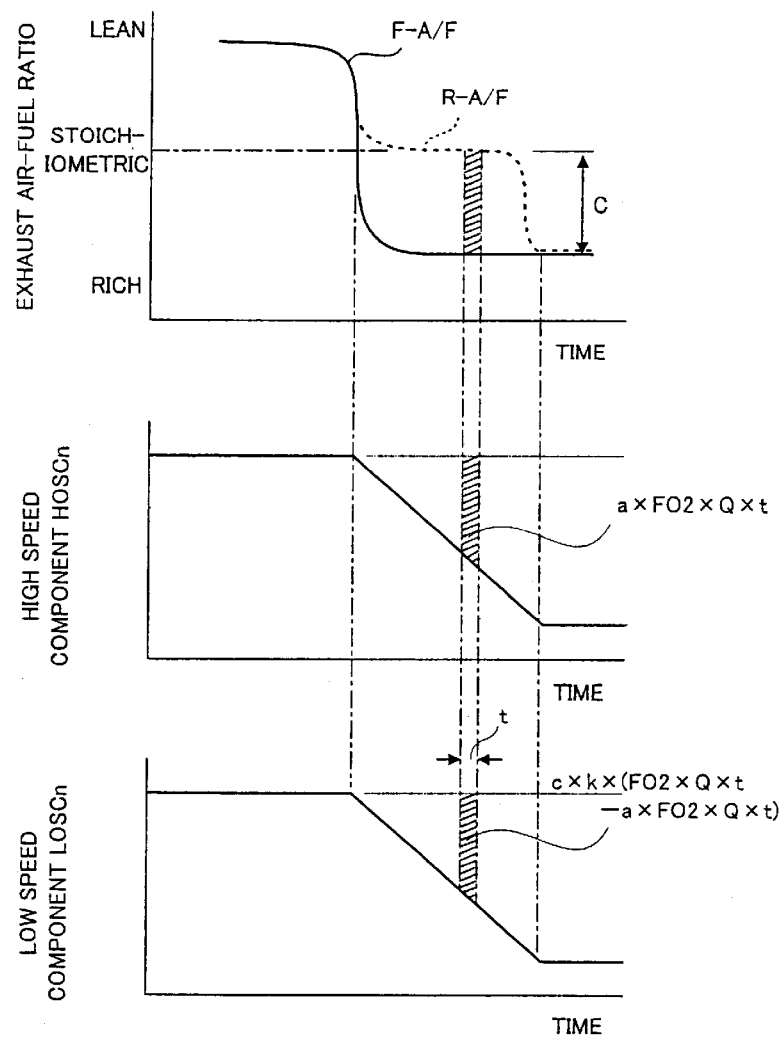

EXHAUST EMISSION CONTROL FOR ENGINE

FIELD OF THE INVENTION

The present invention relates to an engine exhaust purification device provided with a catalyst and more specifically to a control arrangement for an exhaust gas purification device which maintains the air-fuel ratio in a catalytic converter at stoichiometric based on specific oxygen adsorption/release characteristics of the catalyst.

BACKGROUND OF THE INVENTION

In order to remove hydrocarbons (HC), carbon monoxide (CO) and nitrogen oxides (NOx) from engine exhaust gas by using a three-way catalyst, it is important to maintain the gaseous environment of the catalyst to have an oxygen concentration that corresponds closely to a stoichiometric air-fuel ratio of the fuel mixture provided to the engine.

In order to achieve this end, it has been proposed to provide a catalytic converter with the capacity of storing and releasing oxygen in response to the current oxygen concentration so that the gaseous environment of the catalyst is maintained in an atmosphere that has an oxygen concentration which corresponds to the stoichiometric air-fuel ratio. While precious metals which are used in the catalyst have a function of adsorbing and releasing oxygen, it has been proposed to increase the oxygen storage capacity in a manner which achieves the required level by including an oxygen absorbing material such as cerium oxide, barium or base metals on the catalyst substrate.

U.S. Pat. No. 5,842,340 issued on Dec. 1, 1998 in the name of Bush et al., discloses the above type of catalytic converter along with a calculation method for determining the current oxygen storage amount of the catalyst. This method estimates the oxygen storage amount of the catalyst by analysis of an output signal of oxygen sensors provided in the outlet and inlet of the catalytic converter. The air-fuel ratio of the fuel mixture supplied to the engine is thereby controlled so that the oxygen storage amount coincides with a target value.

A similar method is also disclosed in Tokkai Hei 5-195842 published by the Japanese Patent Office in 1993 and Tokkai Hei 7-259602 published by the Japanese Patent Office in 1995.

U.S. Pat. No. 6,116,021 issued on Sep. 12, 2000 in the name of Schumacher et al. discloses providing an estimate of the desorption capacity by integrating an expression from complete saturation to complete depletion. This reference further indicates that an inverted integral may provide a more accurate and reproducible estimate of the oxygen storage and release capacity. Nevertheless, this document does not contain any mention of setting a target storage level about which the air-fuel ratio should be adjusted.

SUMMARY OF THE INVENTION

The target value for the oxygen storage amount is determined based on the oxygen storage capacity of the catalyst as estimated from the variation in the output of the two oxygen sensors. However, when there is a deviation in the performance of the two oxygen sensors, for example, the calculated value of the oxygen storage capacity can drift and become either too large or too small and, as a result, the actual oxygen storage amount may be controlled to a value which differs from the desired target value. This type of deviation in the target value has an adverse effect on the control of the oxygen concentration in the exhaust gas. This invention is therefore directed to increasing the accuracy of the estimation of the oxygen storage capacity of the catalyst.

In order to achieve the above, this invention provides an exhaust emission control arrangement for such an engine that comprises a fuel supply mechanism and an exhaust passage wherein the control arrangement comprises a catalytic converter disposed in the exhaust gas passage The catalytic converter houses a three-way catalyst. The controller also comprises a first oxygen sensor which detects an oxygen concentration of exhaust gas upstream of the catalyst as an upstream oxygen concentration, a second oxygen sensor which detects an oxygen concentration of exhaust gas downstream of the catalyst as a downstream oxygen concentration, and a microprocessor.

The microprocessor is programmed to calculate, from the upstream oxygen concentration, an excess/deficiency oxygen concentration in exhaust gas upstream of the catalyst with respect to a stoichiometric oxygen concentration which corresponds to a stoichiometric air-fuel ratio of a fuel mixture provided to the engine, calculate an oxygen storage amount of the catalyst based on the excess/deficiency oxygen concentration, calculate a specific period oxygen storage amount of the catalyst during a period in which the upstream oxygen concentration is higher than the stoichiometric concentration while the downstream oxygen concentration is in a predetermined concentration range including the stoichiometric oxygen concentration, and calculate a specific period oxygen release amount of the catalyst during a period in which the upstream oxygen concentration is lower than the stoichiometric concentration while the downstream oxygen concentration is in the predetermined concentration range.

The microprocessor is further programmed to sample a specific period oxygen storage amount as a maximum oxygen storage amount at a time at which the downstream oxygen concentration becomes greater than the predetermined concentration range, sample a specific period oxygen release amount as a maximum oxygen release amount at a time at which the downstream oxygen concentration becomes smaller than the predetermined concentration range, and calculate an average value of the maximum oxygen storage amount and the maximum oxygen release amount.

The microprocessor is further programmed to determine a target value of the oxygen storage amount based on the average value, and control a fuel supply amount of the fuel supply mechanism to cause the oxygen storage amount of the catalyst to coincide with the target value.

More specifically, a first aspect of the invention resides in an exhaust purification arrangement for an engine, comprising: a catalyst provided in an exhaust passage of the engine; a front sensor which detects an excess oxygen concentration of oxygen flowing into the catalyst; and a microprocessor programmed to: estimate a first amount of oxygen stored in the catalyst, the first amount estimated to be stored at a first rate; estimate a second amount of oxygen stored in the catalyst; wherein the first rate is estimated based on the excess oxygen concentration and a relationship between the first amount and the second amount; and control an air/fuel ratio of the engine based on an average of the first and second amounts.

A second aspect of the invention resides in a method and apparatus for controlling an air-ratio of an engine having a catalytic converter disposed in an exhaust gas passage connected to the engine, the catalytic converter storing and releasing oxygen and having a saturated in oxygen condition and a completely oxygen depleted condition, comprising: estimating a first storage capacity of the catalytic converter by integrating an excessive oxygen flow rate entering the catalytic converter over a first time interval from the completely depleted condition to the saturated condition; estimating a second storage capacity by integrating an oxygen desorption flow rate over a second time internal from the saturated condition to the completely depleted condition; determining a target value for the oxygen storage level within the catalytic converter based on a mathematical result derived using the first storage capacity and the second storage capacity; and controlling the air-fuel ratio of the exhaust gas supplied to the catalytic converter to maintain the level of oxygen stored within the catalytic converter to maintain the determined target value.

In the above method, the step of determining a target value comprises steps of: averaging the first and second storage capacities; and applying a value, derived using the average, as the target value for the oxygen storage level.

The first time period is determined between a first point in time when the air-fuel ratio downstream of the catalytic converter switches from lean to rich and a second point in time when the air-fuel ratio switches from rich to lean, and wherein the second time period is determined between a third point in time wherein the air-fuel ratio switches from rich to lean and a fourth point in time when the air-fuel ratio switches from lean to rich.

Another aspect of the invention resides in a method and apparatus for controlling the air-fuel ratio of an atmosphere in an catalytic converter which is operatively connected with an internal combustion engine, comprising: storing oxygen on a first material in the catalytic converter which adsorbs and releases oxygen rapidly; storing oxygen on a second material in the catalytic converter which adsorbs and releases oxygen more slowly than the first material; and controlling the air-fuel ratio of the exhaust gas entering the catalytic converter to control the amount of oxygen which is adsorbed on the first material to a predicted predetermined amount which is less than the maximum amount of oxygen which can be adsorbed onto the first material; checking the predicted predetermined amount by controlling the air-fuel ratio of the exhaust gas supplied into the catalytic converter so that the first material becomes saturated with oxygen; controlling the amount of oxygen in the exhaust gas supplied to the catalytic converter so that oxygen is released from the first material; detecting a first period required for the oxygen storage status of the first material to go from full saturation to total depletion; controlling the amount of oxygen in the exhaust gas supplied to the catalytic converter so that oxygen is adsorbed onto the first material; detecting a second period required for the oxygen storage status to go from total depletion to full saturation; detecting the respective mass flow amount of oxygen during the first and second periods and determining the amount of oxygen released and the amount of oxygen adsorbed; comparing the first and second amounts; and determining a target oxygen storage value based on the comparison of the first and second amounts.

Yet another aspect of the present invention resides in an exhaust emission control arrangement for an engine, the engine comprising a fuel supply mechanism and an exhaust passage, the controller comprising: a catalytic converter disposed in the exhaust gas passage, the catalytic converter storing a three-way catalyst; means for detecting an oxygen concentration of exhaust gas upstream of the catalyst as an upstream oxygen concentration; means for detecting an oxygen concentration of exhaust gas downstream of the catalyst as a downstream oxygen concentration; means for calculating, from the upstream oxygen concentration, an excess/deficiency oxygen concentration in exhaust gas upstream of the catalyst with respect to a stoichiometric oxygen concentration which corresponds to a stoichiometric air-fuel ratio of a fuel mixture provided to the engine; means for calculating an oxygen storage amount of the catalyst based on the excess/deficiency oxygen concentration; means for calculating a specific period oxygen storage amount of the catalyst during a period in which the upstream oxygen concentration is higher than the stoichiometric concentration while the downstream oxygen concentration is in a predetermined concentration range including the stoichiometric oxygen concentration; means for calculating a specific period oxygen release amount of the catalyst during a period in which the upstream oxygen concentration is lower than the stoichiometric concentration while the downstream oxygen concentration is in the predetermined concentration range; means for sampling a specific period oxygen storage amount as a maximum oxygen storage amount at a time at which the downstream oxygen concentration becomes greater than the predetermined concentration range; means for sampling a specific period oxygen release amount as a maximum oxygen release amount at a time at which the downstream oxygen concentration becomes smaller than the predetermined concentration range; means for calculating an average value of the maximum oxygen storage amount and the maximum oxygen release amount; means for determining a target value of the oxygen storage amount based on the average value; and means for controlling a fuel supply amount of the fuel supply mechanism to cause the oxygen storage amount of the catalyst to coincide with the target value.

Another aspect of the invention resides in a method of determining a target oxygen content of a catalyst forming part of an exhaust emission control for an internal combustion engine comprising the steps of: determining a first maximum amount of oxygen that a catalyst material can rapidly adsorb; determining a second maximum amount of oxygen that the catalyst material can rapidly release; and averaging the first and second maximum amounts and setting the target oxygen content on a predetermined percentage of the average.

This technique also determines a third maximum amount of oxygen that a storage material associated with the catalyst can store; and determines the effect of the oxygen stored in the storage material on the release characteristics of the catalyst material.

A still further aspect of the invention resides in arrangement for determining a target oxygen content of a catalyst forming part of an exhaust emission control for an internal combustion engine, comprising: an apparatus including and air-fuel ratio sensor and a gas flow sensing arrangement for: determining a first maximum amount of oxygen that a catalyst material can rapidly adsorb; determining a second maximum amount of oxygen that the catalyst material can rapidly release; and averaging the first and second maximum amounts and setting the target oxygen content on a predetermined percentage of the average.

If not specifically set forth above, the invention of course includes apparatus/arrangements for carrying out the steps enumerated in connection with the disclosed techniques.

According to the invention described above, the accuracy of the estimation of the oxygen storage capacity of the catalyst is increased, and accurate control of the gaseous environment of the catalyst is realized. The details as well as other features and advantages of this invention are set forth in the remainder of the specification and are shown in the accompanying drawings.

BRIEF DESCRIPTION OF THE DRAWINGS

FIG. 22 is a flowchart for describing the setting of a coefficient a.

FIG. 23A is a diagram showing the variation of air-fuel ratio before and after the catalyst.

FIGS. 23B and 23C are diagrams showing the oxygen storage amount when the exhaust air fuel ratio is changed from lean to rich.

DESCRIPTION OF THE PREFERRED EMBODIMENTS

Figure 1:
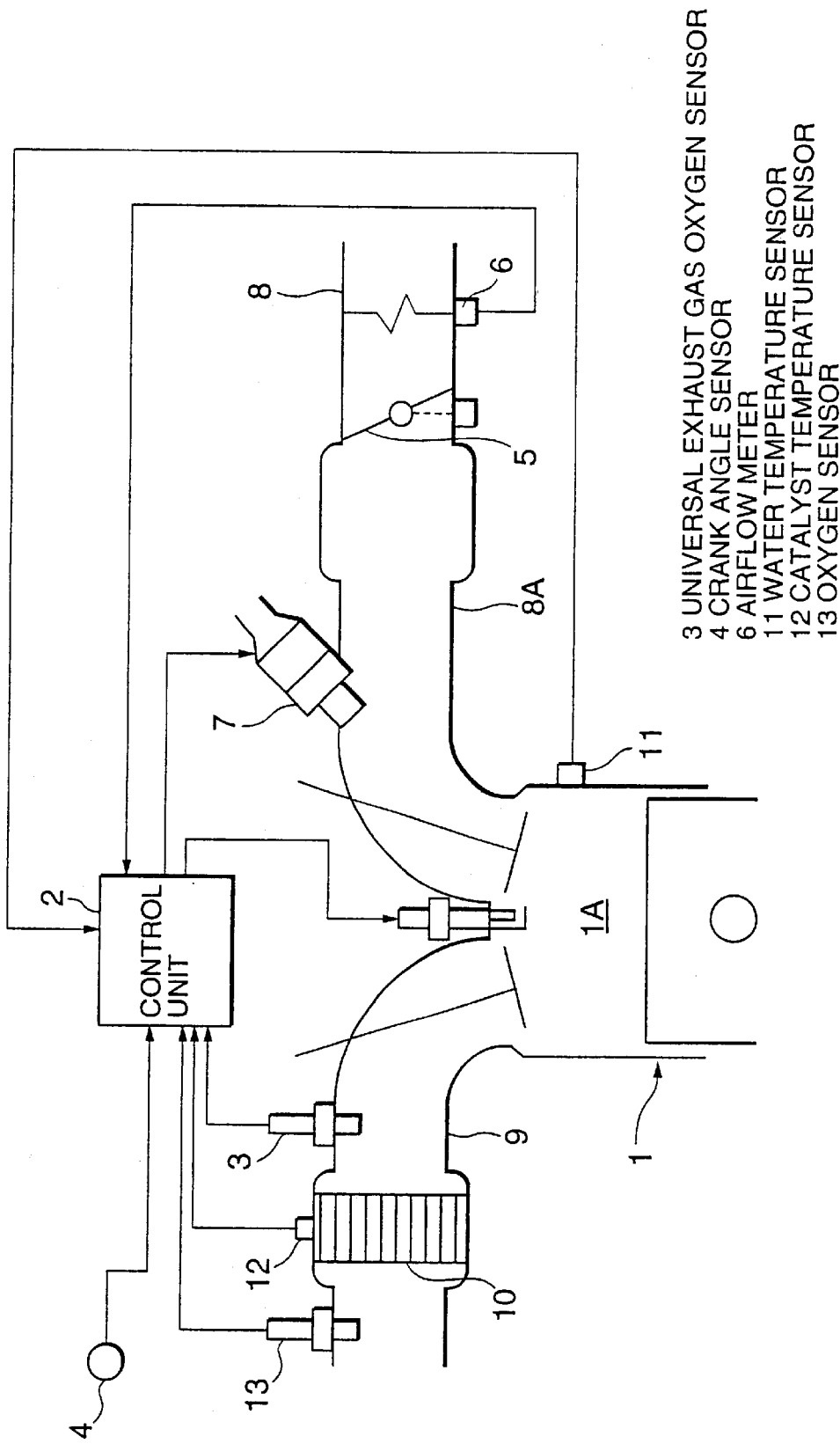
FIG. 1 is a schematic diagram of the structure of an exhaust emission control arrangement for an engine according to this invention.

Referring to FIG. 1 of the drawings, an engine 1 is provided with an intake throttle 5 in an intake passage 8 and a fuel injector 7 in each branch of an intake manifold 8A that connects the intake passage 8 and combustion chambers 1A of the engine 1.

The fuel injector 7 injects fuel into the intake air in the intake manifold 8A in response to a pulse signal from a control unit 2. A catalytic converter 10 is provided in the exhaust passage 9 of the engine 1. A three-way catalyst is stored in the catalytic converter 10. The three-way catalyst is a catalyst known in the art which simultaneously performs oxidation of HC and CO and reduction of NOx in the exhaust gas.

This type of catalyst displays maximum conversion efficiency when the engine 1 is combusting/emitting a fuel mixture having a stoichiometric air-fuel ratio.

Signals are respectively input into the control unit 2 from the crank angle sensor 4 which detects the rotation speed of the engine 1, from the airflow meter 6 which detects the intake air amount of the engine 1, from the water temperature sensor 11 which detects the cooling water temperature of the engine 1 and from the catalyst temperature sensor 12 which detects the catalyst temperature in the catalytic converter 10.

A voltage signal VFAF indicating the oxygen concentration in the exhaust gas is input from an upstream so called "universal" exhaust gas oxygen sensor 3 provided in the exhaust passage 9 upstream of the catalytic converter 10. A voltage signal VRO2 is also input from a downstream oxygen sensor 13 provided in the exhaust passage 9 downstream of the catalytic converter 10.

The universal exhaust gas oxygen sensor 3 is of the type which outputs a signal VFAF which varies proportionally with the oxygen concentration in the exhaust gas and which can detect and indicate a wide range of oxygen concentrations. It should be noted that the signal VFAF input from the universal exhaust gas oxygen sensor 3 represents lower oxygen concentrations by lower values and higher oxygen concentrations by higher values.

On the other hand, the downstream oxygen sensor 13 is a less expensive type of sensor which responds sharply (or disproportionally) to a change in the oxygen concentration and which exhibits an output which varies steeply over a narrow band of air-fuel mixture spanning the stoichiometric ratio. This type of sensor therefore is suitable for detecting a switch between a higher or lower oxygen concentration with respect to an oxygen concentration in the exhaust gas which is present when a fuel mixture of the stoichiometric air-fuel ratio is combusted in the engine. The signal VRO2 input from the oxygen sensor 13 is such that a low voltage signal represents a high oxygen concentration while a high voltage output indicates a low concentration of oxygen in the exhaust.

The oxygen concentration corresponding to the stoichiometric air-fuel ratio is hereinafter referred to as a stoichiometric oxygen concentration.

The control unit 2 calculates a basic fuel injection amount Tp on the basis of these input signals and determines a fuel injection amount Ti by adding various types of corrections. A pulse signal which corresponds to the fuel injection amount Ti is output to the fuel injector 7. The control unit 2 comprises a microcomputer provided with a central processing unit (CPU), a read-only memory (ROM), a random access memory (RAM) and an output interface (I/O interface).

The three-way catalyst stored in the catalytic converter 10 comprises precious metals such as platinum, rhodium or palladium, and oxygen storage materials such as cerium oxide, barium or base metals. The precious metals and the oxygen storage materials are provided in the form of coating on a substrate. Both the precious metals and the oxygen storage material have an oxygen storage capacity and store oxygen when the oxygen concentration in the engine exhaust gas increases above the stoichiometric oxygen concentration. When the oxygen concentration in the exhaust gas is lower than stoichiometric, the stored oxygen is released. In this way, the gaseous environment enveloping the catalyst is maintained at or close to the stoichiometric oxygen concentration thus promoting efficient oxidation and reduction of HC and NOx components.

It should be noted that the oxygen which is adsorbed by the noble metals is quickly adsorbed and released and thus will be referred to as a high speed oxygen component. On the other hand, the oxygen which is stored in the oxygen storage material is more slowly stored and released. This will be referred to as a low speed oxygen component. Further, during the absorption process, the noble metals preferentially adsorb oxygen and it is not until it is saturated and unable to absorb any more oxygen that the slow speed component begins to be stored in the oxygen storage material.

The release characteristics, however, differ from the adsorption process in that until a predetermined ratio of oxygen content in the two different materials is reached, the noble metals tend to release oxygen rapidly. However, after the predetermined balance in the amount of oxygen stored in two storage materials is reached, the rate of release from the noble metals and the oxygen storage material exhibits an essentially linear characteristic. The ramification of these factors will become more clearly appreciated as the disclosure proceeds.

First Embodiment

The oxygen storage capacity of the three-way catalyst is expressed in Equation 1.

$$\text{Oxygen storage amount} = \Sigma\{\text{exhaust gas amount} \times (\text{excess/deficiency oxygen concentration upstream of catalyst} - \text{excess/deficiency oxygen concentration downstream of catalyst})\} \quad (1)$$

The excess/deficiency oxygen concentration is defined as follows.

Figure 4:
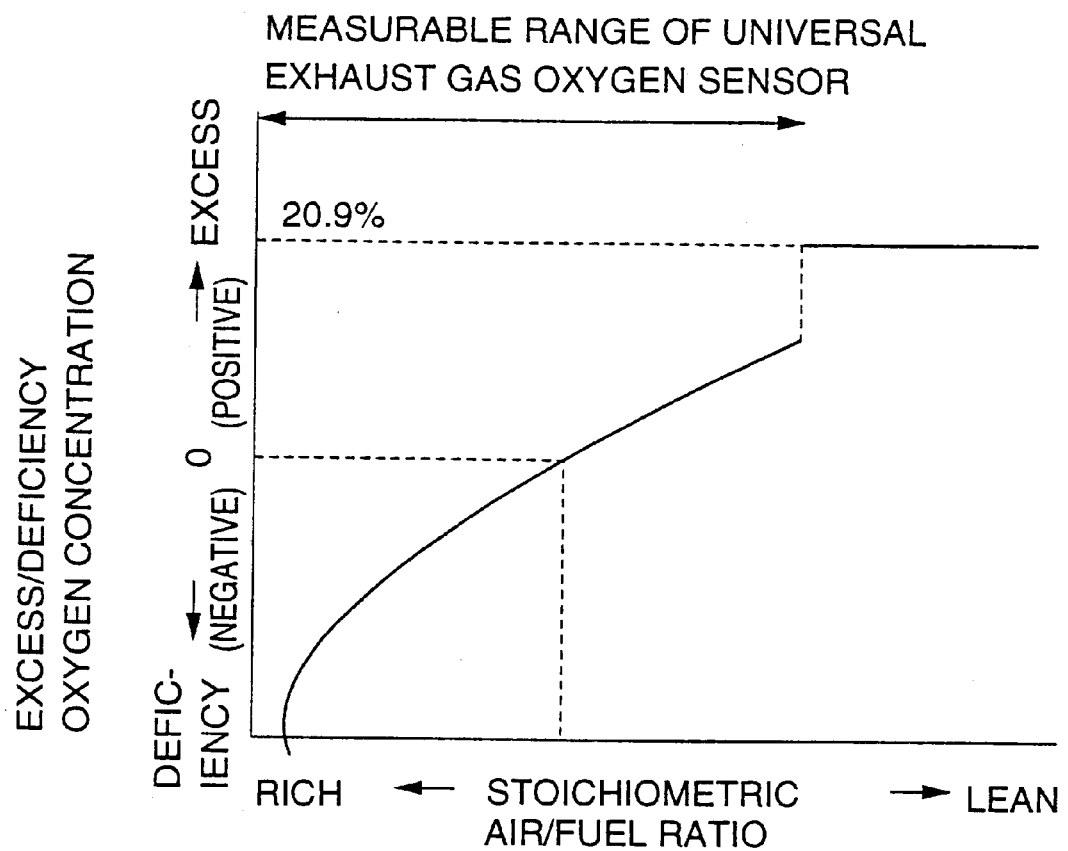
FIG. 4 is a diagram showing the relationship of an output signal of a universal exhaust gas oxygen sensor and an excess/deficiency oxygen concentration according to this invention.

When the stoichiometric oxygen concentration is taken as a reference value having a value of zero, the excess/deficiency ratio of the oxygen concentration is expressed by a positive percentage when the oxygen concentration in the exhaust gas is higher than the reference value and is expressed by a negative percentage when lower than the reference value. Thus, as shown in FIG. 4, the excess/deficiency oxygen concentration of the exhaust gas has a negative value when the air-fuel ratio of the fuel mixture supplied to the engine 1 is rich, that is to say, when the fuel content of the fuel mixture is higher than a content amount corresponding to the stoichiometric air-fuel ratio.

Conversely, the excess/deficiency oxygen concentration of the exhaust gas has a positive value when the air-fuel ratio of the fuel mixture supplied to the engine 1 is lean, that is to say, when the fuel content of the fuel mixture is lower than a content amount corresponding to the stoichiometric air-fuel ratio.

The control unit 2 feedback controls the air-fuel ratio of the fuel mixture based on the output of the universal exhaust gas oxygen sensor 3 so that an average oxygen concentration of exhaust gas coincides with the stoichiometric oxygen concentration. In the following description, this air-fuel ratio control is referred to as lambda ($\lambda$) control.

Lambda ($\lambda$) control facilitates the oxygen concentration of the exhaust gas downstream of the catalyst to be maintained at a stoichiometric concentration and allows the excess/deficiency oxygen concentration of the exhaust gases to assume a zero value.

The oxygen storage amount of the three-way catalyst in this state is expressed by Equation (2).

$$\text{Oxygen storage amount} = \Sigma\{\text{exhaust gas amount} \times \text{excess/deficiency oxygen concentration upstream of catalyst}\} \quad (2)$$

Figure 2:
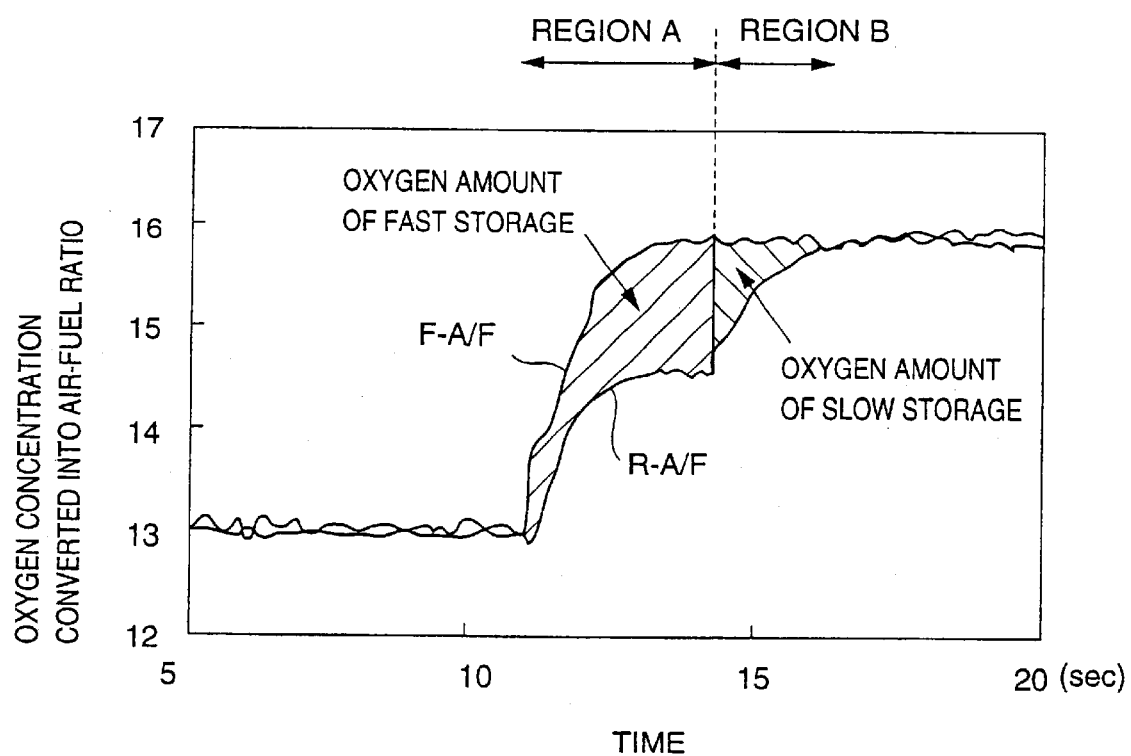
FIG. 2 is a diagram showing variations in oxygen concentration of exhaust gas downstream and upstream of a catalytic converter.

The oxygen concentration downstream and upstream of the catalyst is measured when the fuel mixture supplied to the engine 1 is switched from a rich fuel mixture with an air-fuel ratio of 13 to a lean air-fuel ratio with an air-fuel ratio of 16. The results of these measurements are shown in FIG. 2. The vertical axis in the figure shows the values of the oxygen concentration converted into air-fuel ratios of the fuel mixture.

In region A, all the excess oxygen flowing into the catalytic converter is stored in the catalyst (as the high speed component), and as a result, the oxygen concentration downstream of the catalyst as shown by the curved line R-F/A remains at a stoichiometric value, even when the oxygen concentration upstream of the catalyst as shown by the curved line F-A/F is high.

In contrast, in the region B, the catalyst can no longer store the available oxygen sufficiently quickly and thus all of the excess oxygen flowing into the catalytic converter is not absorbed, and thus the oxygen concentration downstream of the catalyst becomes higher an exceeds the stoichiometric value.

It should be noted that the catalyst continues to store oxygen or oxides such as nitrogen oxide (NO) even when the oxygen concentration downstream of the catalyst is higher than a stoichiometric value. However this oxygen storage is slower in speed than the oxygen storage performed in region A.

The reason for the fast and slow storages which occur in regions A and B is assumed to be brought about by the fact that, although the precious/noble metals contained in the catalyst physically adsorb oxygen, that is to say, adsorb oxygen in a molecular state, the oxygen storage material absorbs oxygen in the form of a compound via chemical bonding. It is considered that differences in oxygen storage speed result from these differences.

Thus, in FIG. 2, it is possible to regard the oxygen storage amount of the catalyst when the oxygen concentration downstream of the catalyst increases from a stoichiometric value as the oxygen storage amount of the catalyst precious metals and to regard the oxygen storage amount of the catalyst thereafter as the oxygen storage amount of the oxygen storage material.

However, the sum of the storage amounts of these two components is affected by the slower absorption speed of the oxygen storage material. Considerable time is required to control the average oxygen concentration in the exhaust gas due to the variation in the oxygen storage amount of the oxygen storage material. As will be appreciated, if the air-fuel ratio is maintained at either a lean or a rich level for a protracted period of time so allow for the lower speed component, the efficiency of the control in reducing toxic components of the exhaust gas will be detrimentally affected. Accordingly, the basic control is centered around the fast component or amount of oxygen which is adsorbed or released by the noble metal portion of the catalyst even though the oxygen absorbing material is capable of storing more oxygen than the noble metals.

The control unit 2 of the exhaust gas emission controller of this invention performs the following air-fuel ratio control of the fuel mixture. When the oxygen concentration of exhaust gases downstream of the catalytic converter 10 has a value approximately equal to a stoichiometric value, an oxygen storage amount (fast component) for the precious metals in the catalyst is calculated based on the excess/deficiency oxygen concentration in a unit time upstream of the catalytic converter 10. When predetermined control conditions are established, the air-fuel ratio of the fuel mixture supplied to the engine 1 is controlled so that the oxygen storage amount of precious metals in the catalyst corresponds to a target value set only with respect to the oxygen storage amount of precious metals in the catalyst. This control is performed by introducing a correction coefficient for reaching a target oxygen storage amount of the precious metals in the catalyst into the lambda (λ) control. Specifically, the fuel injection amount Ti during lambda (λ) control is calculated from the following Equation (3).

$$Ti = Tp \times TFBYA \times \alpha \times H \times 2 + Ts \tag{3}$$

where,

Tp=basic injection amount,

TFBYA=a target equivalence ratio corresponding to the inverse of the target air-fuel ratio, α=air-fuel ratio feedback correction coefficient, H=correction coefficient for reaching a target oxygen storage amount of the precious metals in the catalyst, and Ts=ineffectual injection amount.

The fuel injection amount Ti, the basic injection amount Tp and the ineffectual injection amount Ts are all generated as a pulse width of a pulse signal output from the control unit 2 to the fuel injector 7.

The coefficients for each amount other than the correction coefficient H in the above equation are known and are disclosed in U.S. Pat. No. 5,529,043, for example.

Figure 3:
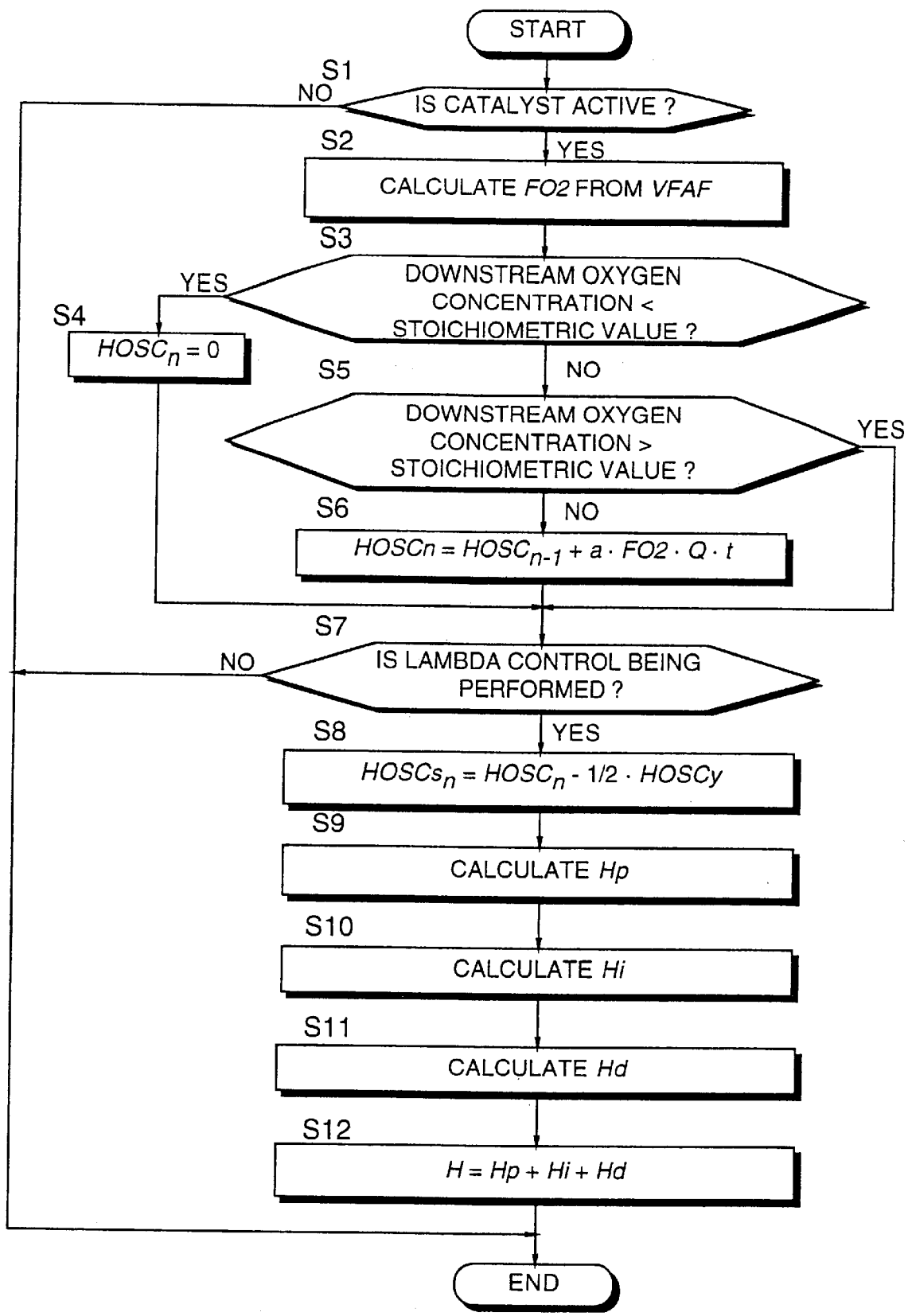
FIG. 3 is a flowchart showing a calculating routine of a correction amount for an engine fuel injection amount performed by a control unit according to this invention.

Referring now to FIG. 3, a calculation routine of the correction coefficient H executed by the control unit 2 during this control routine will be described in detail. This routine is executed at intervals of 10 milliseconds, for example.

In step S1, it is determined whether or not the three-way catalyst in the catalytic converter 10 has become active based on an estimate derived from the engine coolant temperature as sensed by temperature sensor 11 or, alternatively a direct temperature measurement of the catalyst material by temperature sensor 11. If the three-way catalyst is not active, the routine is immediately terminated since the oxygen storage function of the catalyst is not available.

When the catalyst is determined to be active, in step S2, the routine calculates an excess/deficiency oxygen concentration FO2 present in the exhaust gases based on the signal VFAF input from the universal exhaust gas oxygen sensor 3 upstream of the catalytic converter 10.

Figure 5:
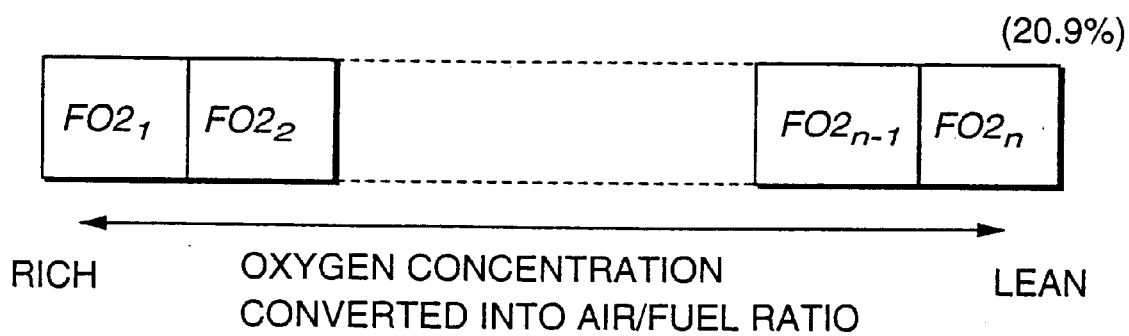
FIG. 5 is a diagram showing a table of an excess/deficiency oxygen concentration stored in the control unit.

The calculation is performed by a look-up from the table shown in FIG. 5 which is pre-stored in a memory of the control unit 2 and which represents characteristics of the excess/deficiency oxygen concentration shown in FIG. 4 in the form of numerical values. In FIG. 5, the oxygen concentration is represented by a corresponding air-fuel ratio of the fuel mixture supplied to the engine 1.

Since the range of air-fuel ratios for combusting the fuel mixture is known, the measurable range of the universal exhaust gas oxygen sensor 3 may be set equal to this range. When the fuel is cut-off to the engine 1, such as can occur during certain modes of deceleration, the oxygen concentration in the exhaust gases is outside the measurable range. Practically, when the oxygen concentration is determined to be out of the measurable range, it is understood that the fuel has in fact been cut off. The excess/deficiency oxygen concentration FO2 in this case is taken to be +20.9% as shown in FIG. 4.

Next, in step S3, the signal VRO2 input from the oxygen sensor 13 downstream of the catalyst is compared with the stoichiometric oxygen concentration. When the oxygen concentration represented by the signal VRO2 is lower than the stoichiometric oxygen concentration, the high speed oxygen storage amount of the precious metals in the catalyst is indicated as being zero.

In this case, the routine proceeds to step S4 and resets an oxygen storage amount $HOSC_n$ of the precious metals in the catalyst to zero. Thereafter, the routine proceeds to step S7. The term $HOSC_n$ is the value calculated by the routine on the current occasion and the term $HOSC_{n-1}$ is the value calculated by the routine on the previous occasion.

On the other hand, in step S3, when the oxygen concentration represented by the signal VRO2 is greater than or equal to the stoichiometric oxygen concentration, the routine proceeds to step S5 and determines whether or not the oxygen concentration represented by the signal VRO2 is higher than the stoichiometric oxygen concentration. When the oxygen concentration represented by the signal VRO2 is not higher than the stoichiometric oxygen concentration, the relationship with the determination result of step S3 shows that the gaseous environment of the catalyst is being maintained at the stoichiometric oxygen concentration and that the catalyst is compensating for the variations in the oxygen concentration upstream of the catalytic converter 10. In this case, the routine proceeds to step S6. When the oxygen concentration represented by the signal VRO2 is higher than the stoichiometric oxygen concentration in step S5, the routine proceeds to step S7.

When the routine proceeds to step S6, it is sometimes the case that lambda (λ) control is not performed.

In step S6, the oxygen storage amount $HOSC_n$ of the precious metals in the catalyst is calculated from the following equation (4).

$$HOSC_n = HOSC_{n-1} + a \times FO2 \times Q \times t \tag{4}$$

where, $HOSC_n$=the value of $HOSC_n$ on the previous occasion the routine was executed, a=constant for determining the speed of oxygen storage or oxygen release that also contains the value for unit conversion, FO2=excess/deficiency oxygen concentration, Q=exhaust gas flow amount, and t=routine execution interval (e.g. 10 milliseconds).

The exhaust gas flow amount Q may be substituted by the aspirated air flow amount detected by the airflow meter 6.

The value FO2×Q×t in Equation (4) above, is the excess/deficiency oxygen concentration per execution interval of the routine. The high speed oxygen amount which has been stored by the precious metals of the catalyst or which has been released by the precious metals of the catalyst after the previous execution of the routine is calculated by multiplying the constant a which determines the speed of oxygen release or oxygen absorption by the excess/deficiency oxygen concentration per execution interval of the routine. The current oxygen storage amount of the precious metals of the catalyst is calculated by adding this calculation result to the oxygen storage amount $HOSC_{n-1}$ from the previous occasion the routine was executed.

It should be noted that when the oxygen concentration upstream of the catalytic converter 10 is higher than the stoichiometric oxygen concentration, the air-fuel ratio of the fuel mixture supplied to the engine 1 is lean. In this case, the second term of Equation (4) determines the oxygen amount stored in the precious metal of the catalyst after the previous occasion the routine was executed as a positive value. When the oxygen concentration upstream of the catalytic converter 10 is lower than the stoichiometric oxygen concentration, the air-fuel ratio of the fuel mixture supplied to the engine 1 is rich. In this case, the second term of Equation (4) determines that the oxygen amount released from in the precious metal of the catalyst after the previous occasion the routine was executed as a negative value.

After the calculation in step S6, the routine proceeds to step S7 wherein it is determined whether or not lambda ($\lambda$) control is being performed.

Lambda ($\lambda$) control is only performed when the universal exhaust gas oxygen sensor 3 is active. Furthermore, when fuel is cut off in the engine 1 or when the engine is operating under a high load, lambda ($\lambda$) control is not executed.

When lambda ($\lambda$) control is executed in steps S8 to S12, the routine performs the calculation of the correction coefficient H. When lambda ($\lambda$) control is not executed, the calculation of the correction coefficient H is not performed and the routine is terminated.

In other words, the calculation of the oxygen storage amount $HOSC_n$ by the precious metals in the catalyst is always performed when the three-way catalyst in the catalytic converter is active. In contrast, feedback control of the air-fuel ratio so that the oxygen storage amount $HOSC_n$ corresponds with the target value is limited to situations in which lambda ($\lambda$) control is performed. Feedback control is performed by the known types of proportional-integral-differential control. In step S8, the difference $HOSCs_n$ of the oxygen storage amount $HOSC_n$ and the target value for the oxygen storage amount is calculated from Equation (5).

$$HOSCs_n = HOSC_n - HOSCy \times \tfrac{1}{2} \quad (5)$$

where, HOSCy=oxygen storage capacity of the precious metals in the catalyst.

As seen in Equation (5), the target value is set to ½ of the oxygen storage capacity HOSCy of the precious metals-in the catalyst. The oxygen storage capacity HOSCy is calculated by the routine shown in FIG. 6 that will be described later.

Next in step S9, the proportional factor Hp of the feedback correction amount is calculated from Equation (6).

$$Hp = \text{proportional gain} \times HOSCs_n \quad (6)$$

In step S10, the integral factor Hi of the feedback correction amount is calculated from Equation (7).

$$Hi = \text{integral gain} \times \Sigma HOSCs_n \quad (7)$$

In step S11, the differential factor Hd of the feedback correction amount is calculated from Equation (8).

$$Hd = \text{differential gain} \times (HOSCs_n - HOSCs_{n-1})/t \quad (8)$$

where, t=routine execution interval (=10 milliseconds).

In step S12, the sum of the proportional factor Hp, the integral factor Hi and the differential factor Hd, is set as a correction coefficient H and the routine is terminated.

The control unit 2 calculates a fuel injection amount Ti of the engine 1 by Equation (3) using the correction coefficient H and a corresponding pulse signal is output to the fuel injector 7.

In the above manner, only the oxygen storage amount due to the precious metal in the catalyst is calculated and the air-fuel ratio is controlled so that the calculated value coincides with the target value of the oxygen storage amount of the precious metals in the catalyst.

Thus, the oxygen storage amount converges to the target value in a short time. Furthermore, in accordance with this embodiment, it is possible to omit the influence of the oxygen storage material which does not contribute to the short-term variation of the gaseous environment of the catalyst. Since the target value of the oxygen storage amount is set to ½ of the oxygen storage capacity of the precious metals in the catalyst, excess or deficiency in the actual oxygen storage amount is unlikely to occur and it is possible to always maintain the conversion performance of toxic/noxious components in the exhaust gas by the catalyst to an optimum level.

The calculation of the oxygen storage capacity HOSCy is set forth below.

According to the research conducted during the development of this embodiment, the following phenomenon occurs due to deviations in performance of the universal exhaust gas oxygen sensor 3 or the oxygen sensor 13.

Even when the oxygen concentration in the exhaust gas downstream of the catalytic converter 10 is approximately equal to the stoichiometric oxygen concentration, the continuous period in which the oxygen concentration in the exhaust gas upstream of the catalytic converter 10 is lower than the stoichiometric oxygen concentration, is not always equal to the continuous period in which the oxygen concentration of the exhaust gases upstream of the catalytic converter 10 is higher than the stoichiometric oxygen concentration.

Figures 7A, 7B:
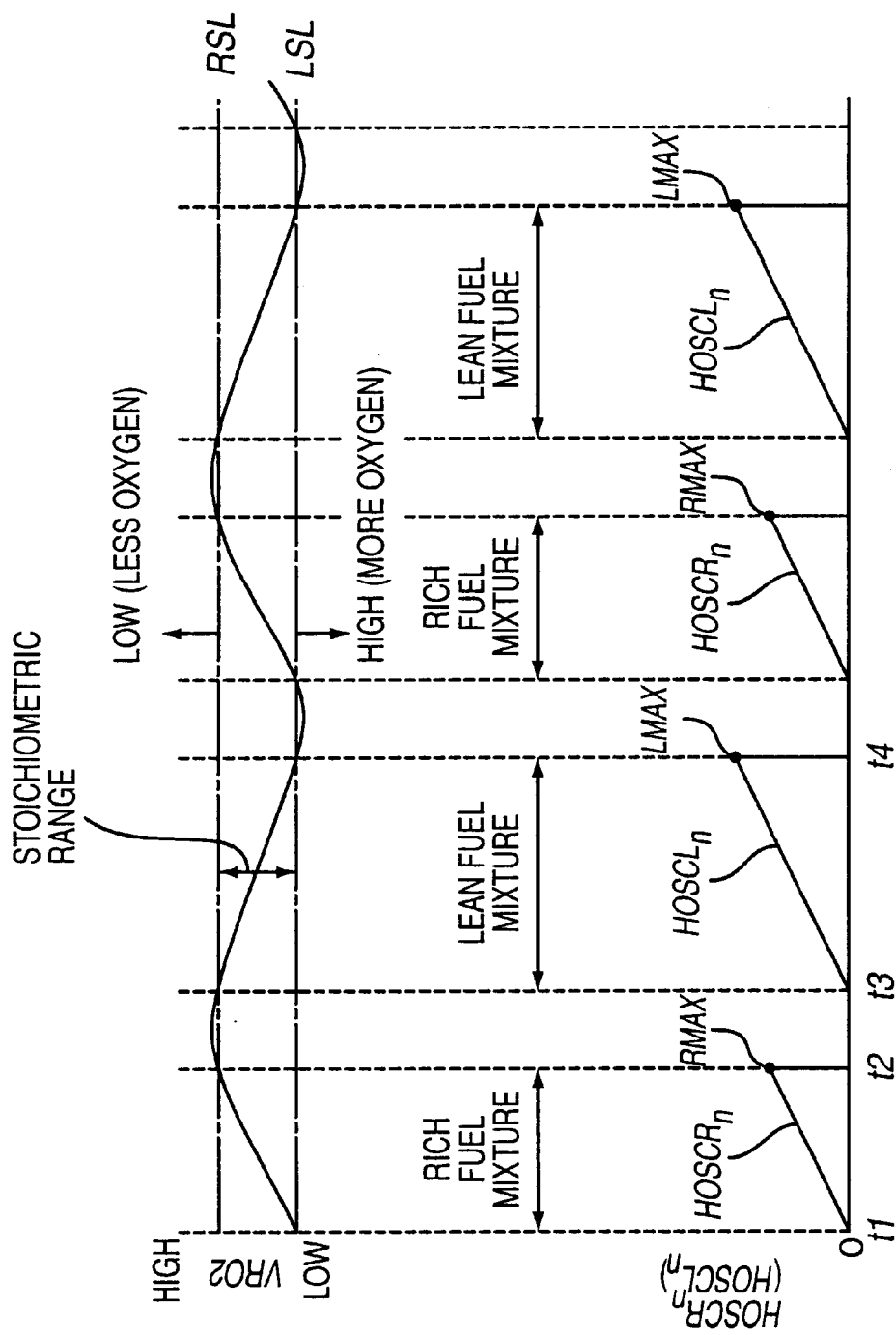
FIGS. 7A and 7B are waveform diagrams showing the relationship of a catalyst oxygen storage amount and an output signal of an oxygen sensor, according to this invention.

Referring to FIGS. 7A and 7B, the signal VRO2 input from the downstream oxygen sensor 13 downstream of the catalytic converter 10 is varied discontinuously even in a steady state under lambda ($\lambda$) control. When VRO2 is less than a lean slice level LSL, it is determined that the oxygen concentration downstream of the catalytic converter 10 is higher than the stoichiometric concentration. When VRO2 is greater than a rich slice level RSL, it is determined that the oxygen concentration downstream of the catalytic converter 10 is lower than the stoichiometric concentration. As explained earlier, the signal VRO2 represents low oxygen concentrations by high values and high oxygen concentrations by low values.

When VRO2 is between the slice levels LSL and RSL, that is to say for example, between the time intervals t1–t2 and the time interval t3–t4, it is determined that the oxygen concentration of the exhaust gases downstream of the catalytic converter 10 has a value approximately equal to the stoichiometric concentration. Hereafter the region of oxygen concentrations between the slice levels LSL and RSL, is referred to as a stoichiometric range.

Between the time interval t1–t2 and the time interval t3–t4, even though the oxygen concentration downstream of the catalytic converter 10 is in the stoichiometric range, the oxygen concentration upstream of the catalytic converter 10 during the time interval t1–t2 and that during the time interval t3–t4 are different. The oxygen concentration upstream of the catalytic converter 10 is lower than the stoichiometric oxygen concentration in the time interval t1–t2 and, i.e., the air-fuel ratio of the fuel mixture supplied to the engine 1 is rich. On the other hand, the oxygen concentration is higher than the stoichiometric oxygen concentration in the time interval t3–t4, i.e., the air-fuel ratio of the fuel mixture supplied to the engine 1 is lean.

Thus, the oxygen storage amount of the precious metals in the catalyst at a timing at which the oxygen concentration downstream of the catalytic converter 10 becomes lower than LSL may be taken to be the oxygen storage capacity HOSCy of the precious metals and one half of that value may be taken as the target value. In such a case, however, the target value is affected by the deviations in the performance of the universal exhaust gas oxygen sensor 3 or the oxygen sensor 13.

In the figure, the time interval t3–t4 is longer than the time interval t1–t2. Thus, the interval of the lean fuel mixture is longer than the actual interval and the maximum oxygen storage amount calculated in this interval has a larger value than the actual value. As a result, the target value of the oxygen storage amount is set to be greater than the correct value. Conversely, the time interval t3–t4 may be shorter than the time interval t1–t2 due to deviations in the performance of the oxygen sensors. In this case, the target value of the oxygen storage amount is set to be smaller than the original value.

In order to cancel out such an error, the control unit 2 of the exhaust emission control arrangement according to this invention sets the target value of the oxygen storage amount in the following manner.

Firstly, a maximum oxygen storage amount LMAX of the precious metals in the catalyst is calculated from the signal VFAF, when the oxygen concentration in the exhaust gas downstream of the catalytic converter 10 has a value approximately equal to the stoichiometric oxygen concentration while a lean fuel mixture is supplied to the engine 1. On the other hand, a maximum oxygen release amount RMAX of the precious metals in the catalyst is calculated from the signal VFAF, when the oxygen concentration in the exhaust gas downstream of the catalytic converter 10 has a value approximately equal to the stoichiometric oxygen concentration while a rich fuel mixture is supplied to the engine 1. An average value of the maximum oxygen storage amount LMAX and the maximum oxygen release amount RMAX is set as an oxygen storage capacity HOSCy.

Figure 6:
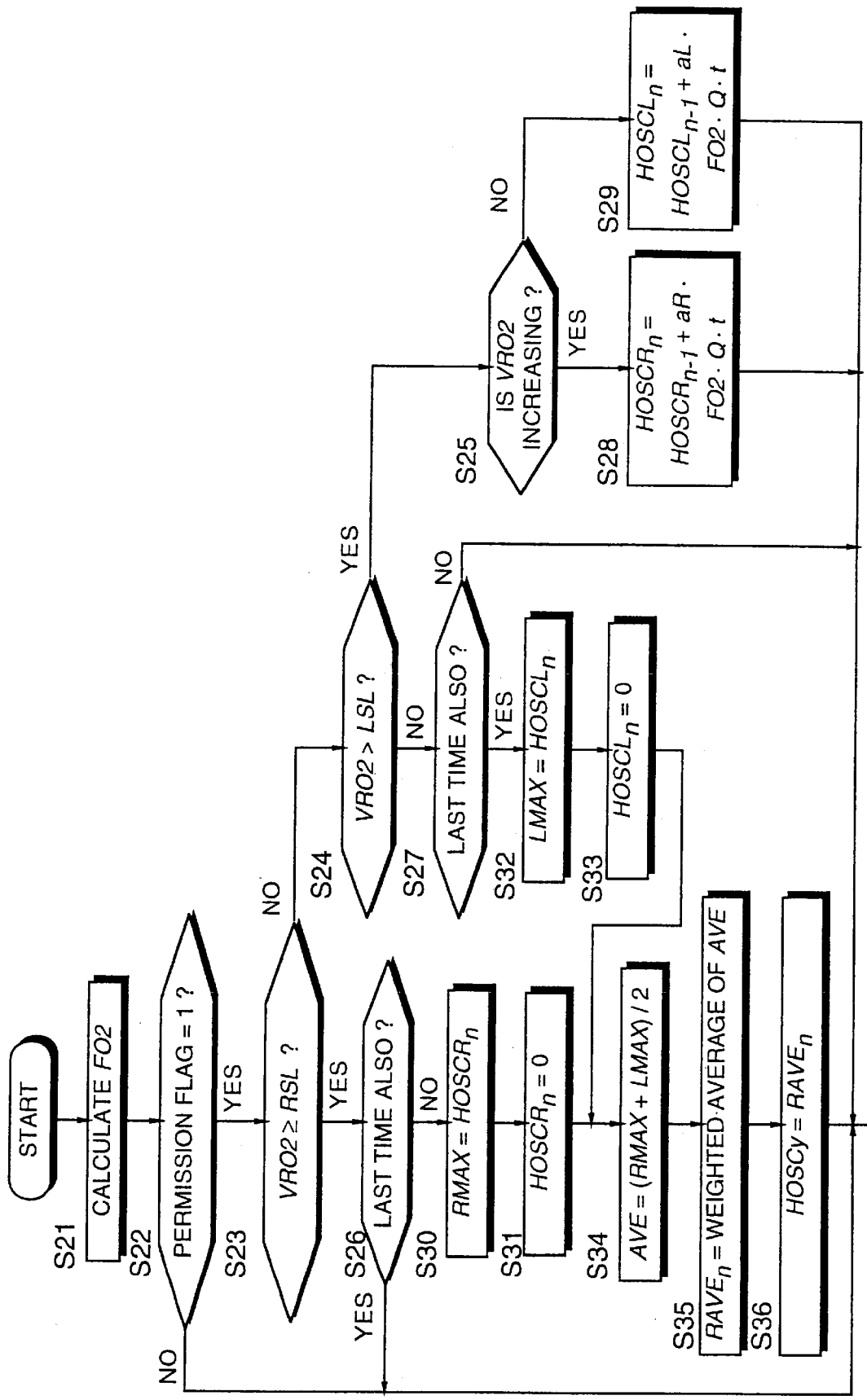
FIG. 6 is a flowchart showing a calculating routine of a maximum oxygen storage amount of a catalyst precious metal performed by the control unit.

Referring now to FIG. 6, a calculation routine for the oxygen storage capacity HOSCy of precious metals in the catalyst executed by the control unit 2 will be described below. This routine is executed at intervals of 10 milliseconds.

In step S21, an excess/deficiency oxygen concentration FO2 of exhaust gases is calculated in the same manner as step S2 in FIG. 3. In a following step S22, it is determined whether or not the calculation conditions of the oxygen storage capacity HOSCy of the precious metal in the catalyst are established. This is performed based on the determination of a permission flag determined by a routine shown in FIG. 8. The routine proceeds to step S23 when the permission flag has a value of one. When the permission flag has a value of zero, the routine is immediately terminated.

In steps S23–S27, the signal VRO2 input from the oxygen sensor 13 is compared with the slice levels RSL and the slice level LSL. Furthermore it is determined whether or not the signal VRO2 corresponds to any of the following five situations.

(1) When the signal VRO2 is in the stoichiometric range and a lean fuel mixture is supplied to the engine 1;

(2) when the signal VRO2 is in the stoichiometric range and a rich fuel mixture is supplied to the engine 1;

(3) when the signal VRO2 becomes lower than the slice level LSL;

(4) when the signal VRO2 becomes greater than the slice level RSL; and (5) other cases (including the case when the output of the signal VRO2 becomes lower than the slice level RSL and the case when the signal VRO2 becomes greater than the slice level LSL).

Referring again to FIGS. 7A and 7B, situation (1) corresponds for example to the time interval t3–t4 and situation (2) corresponds for example to the time interval t1–t2. Situation (3) corresponds for example to the time t4, situation (4) corresponds for example to the time t2 and situation (5) corresponds for example to the time t1 and the time t3.

Referring back to FIG. 6, in situation (1), the routine passes through steps S23, S24 and S25 and proceeds to step S29. In step S29, a specific period oxygen storage amount $HOSCL_n$ of the precious metal in the catalyst is calculated using Equation (9) which corresponds to Equation (4). Thereafter the routine is terminated.

$$HOSCL_n = HOSCL_{n-1} + aL \times FO2 \times Q \times t \qquad (9)$$

where, $HOSCL_{n-1}$=specific period oxygen storage amount calculated by the routine on the previous occasion, aL=positive constant containing values for unit conversion, FO2=excess/deficiency oxygen concentration, Q=exhaust flow amount (substituted by aspiration air flow amount), and t=routine execution interval (10 milliseconds).

The constant aL is set equal to the constant a in Equation (4).

In situation (2), the routine proceeds to step S28 through steps S23, S24 and S25.

In step S28, a specific period oxygen release amount $HOSCR_n$ of the precious metal in the catalyst is calculated using Equation (10) which corresponds to Equation (4). Thereafter the routine is terminated.

$$HOSCR_n = HOSCR_{n-1} + aR \times FO2 \times Q \times t \qquad (10)$$

where, $HOSCR_{n-1}$=specific period oxygen release amount calculated by the routine on the previous occasion, aR=positive constant containing values for unit conversion, FO2=excess/deficiency oxygen concentration, Q=exhaust flow amount (substituted by aspiration air flow amount), and t=routine execution interval (10 milliseconds).

The constant aR is set equal to the constant aL in Equation (9).

In situation (3), the routine proceeds to step S32 through steps S23, S24 and step S27.

In step S32, the specific period oxygen storage amount $HOSCL_n$ of the precious metal in the catalyst is stored as a maximum catalyst storage amount LMAX. Then in step S33, the specific period oxygen storage amount $HOSCL_n$ of the precious metal in the catalyst is reset to zero and the routine proceeds to step S34.

In the situation (4), the routine proceeds to step S30 through step S23 and step S26. In step S30, the specific period oxygen release amount $HOSCR_n$ of the precious metal in the catalyst is stored as a maximum catalyst release amount RMAX. Then, in step S31, the specific period oxygen release amount $HOSCR_n$ of the precious metal in the catalyst is reset to zero and the routine proceeds to step S34.

The average value AVE of the stored values of the maximum catalyst storage amount LMAX and the maximum catalyst release amount RMAX is calculated in step S34 by Equation (11).

$$AVE = (LMAX + RMAX)/2 \quad (11)$$

Furthermore, a weighted average $RAVE_n$ of the average value AVE is calculated by Equation (12) in a following step S35 in order to suppress variations in the average value AVE.

$$RAVE_n = AVE \times G + RAVE_{n-1} \times (1-G) \quad (12)$$

where, $RAVE_{n-1}$=weighted average value calculated in the routine on the previous occasion, and G=weighted average coefficient.

In a following step S36, the oxygen storage capacity HOSCy of the precious metal in the catalyst is set to be equal to the weighted average value $RAVE_n$.

In situation (5), if either the determination in step S26 or the determination in step S27 becomes negative, the routine is immediately terminated. The oxygen storage capacity HOSCy of the precious metal in the catalyst is stored in the memory (RAM) of the control unit 2 and is used in step SB during the routine as shown in FIG. 3.

In this manner, the exhaust emission control arrangement corrects deviations in the performance of the universal exhaust gas oxygen sensor 3 and the oxygen sensor 13 and reduces the effect on the target value of the oxygen storage amount due to deviations in such performance. Thus, it is possible to improve the control accuracy of the air-fuel ratio of the engine 1.

Figure 8:
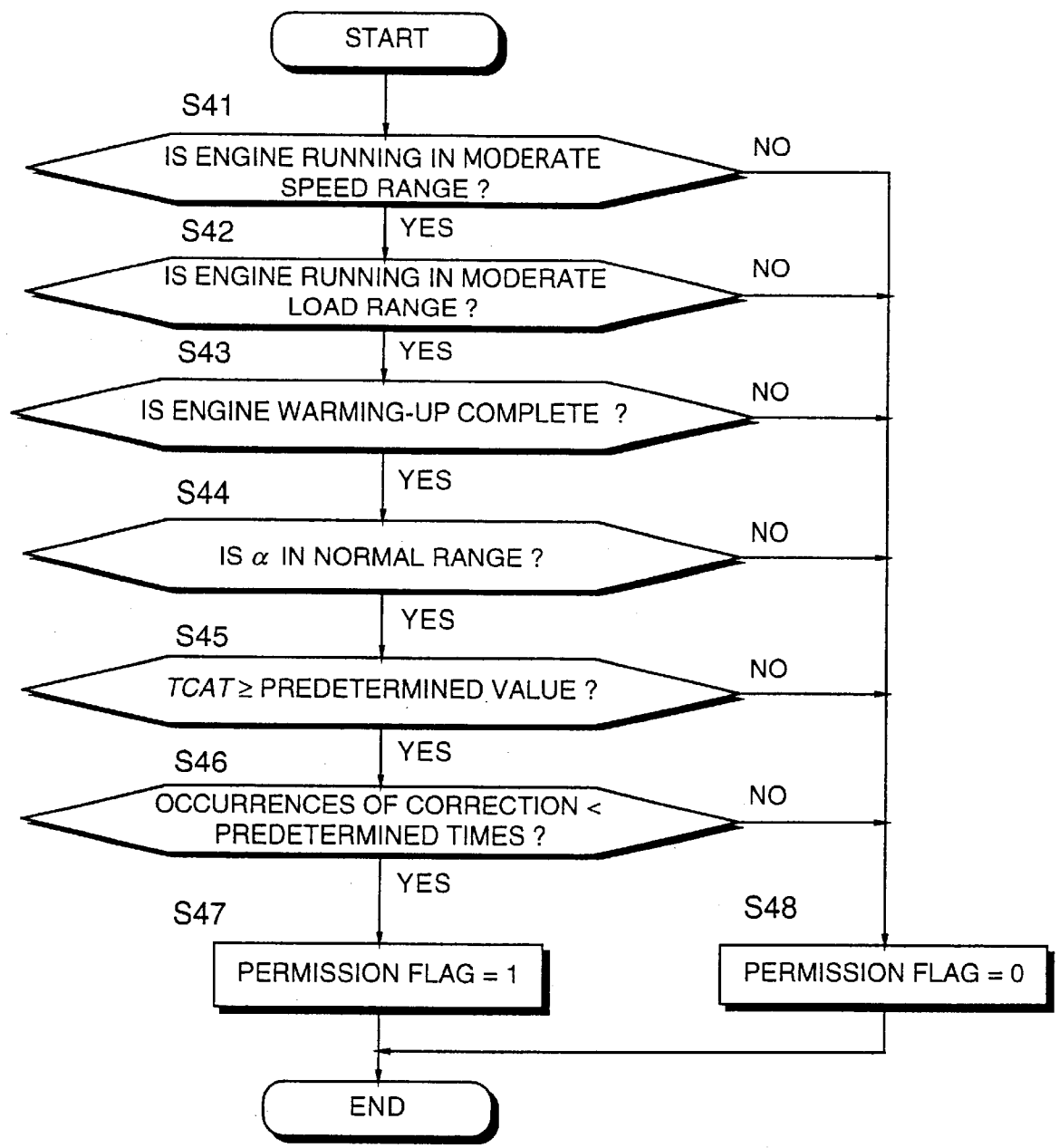
FIG. 8 is a flowchart showing a determining routine of calculation conditions for the oxygen storage amount performed by the control unit.

Referring to FIG. 8, the routine which is executed by the control unit 2 to determine the calculation conditions for the oxygen storage capacity HOSCy of the precious metal in the catalyst will be described. The calculation permission flag set in this routine is used to determine step S22 in FIG. 6. This routine is executed at intervals of 10 milliseconds.

In step S41, it is determined whether or not the rotation speed of the engine 1 corresponds to a moderate rotation speed range, i.e., neither to a low rotation speed region nor to a high rotation speed region. In step S42, it is determined whether or not the load on the engine 1 corresponds to a moderate load range, i.e., neither to a low load region nor to a high load region. In step S43, it is determined whether or not the engine warming-up is completed from the cooling water temperature of the engine 1 detected by the water temperature sensor 11. In step S44, it is determined whether or not the variations in the air-fuel ratio feedback correction coefficient alpha are within a normal range. In step S45, it is determined whether or not the catalyst temperature TCAT (e.g. 300° C.) detected by the catalyst temperature sensor 12 is greater than or equal to a predetermined temperature. In step S46, it is determined whether or not the deviation correction occurrences of the signal VFAF of the universal exhaust gas oxygen sensor 3 are less than a predetermined number of times.

When the determination conditions in steps S41 to S46 are all satisfied, the routine sets the calculation permission flag to a value of "1" in step S47 as the calculation conditions of the oxygen storage capacity HOSCy are satisfied, and the routine is terminated. When any of the conditions in steps S41 to S46 are not satisfied, the routine resets the calculation permission flag to a value of zero in step S48, and the routine is terminated.

When the catalyst is not active (viz., is below its activation temperature), oxygen release from the catalyst or oxygen storage to the catalyst are difficult to judge/determine. Thus, it is not possible to correctly calculate the oxygen storage capacity HOSCy of the precious metals in the catalyst, even if the maximum value LMAX of the oxygen storage amount or the maximum value RMAX of the oxygen release amount are sampled. Deviations in the oxygen storage capacity HOSCy are suppressed by allowing the calculation of the oxygen storage capacity HOSCy only when the conditions in steps S41–S46 are established.

Figure 9A:
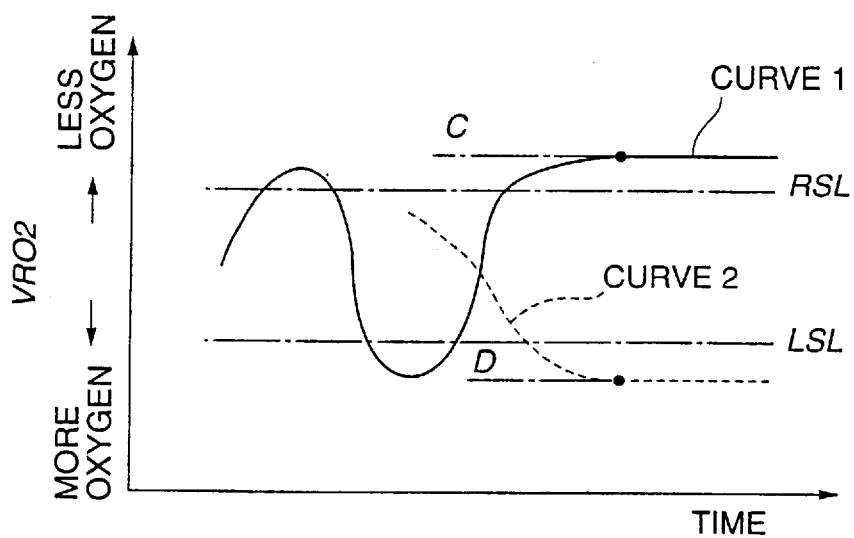
FIGS. 9A and 9B are diagrams showing variations in the oxygen concentration downstream of the catalytic converter when the universal exhaust gas oxygen sensor has a deviation in its output.
Figure 9B:
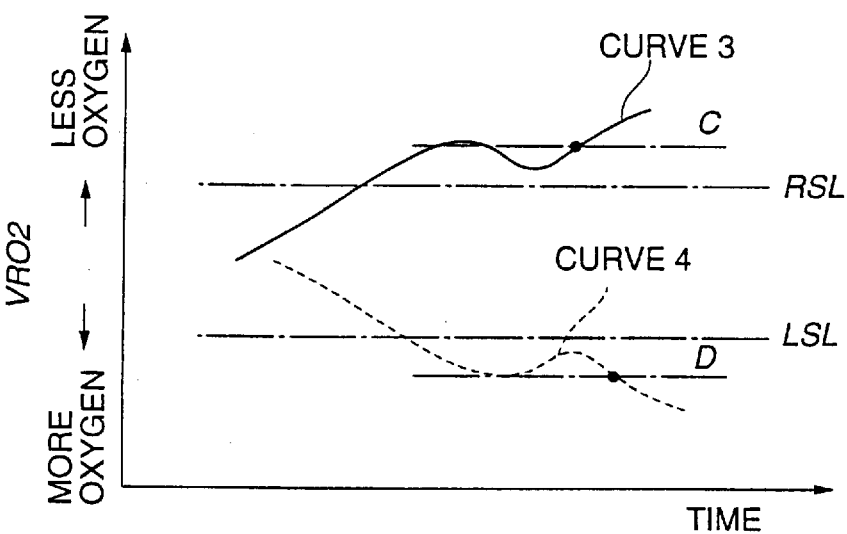

Next, the deviation correction occurrences of the output of the universal exhaust gas oxygen sensor 3 determined in step S46 will be described referring to FIGS. 9A and 9B.

The signal VFAF input from the universal exhaust gas oxygen sensor 3 may deviate even under lambda (λ) control. In this case, the signal VRO2 input from the oxygen sensor 13 displays variation outside the normal range. When the signal VFAF deviates as if the oxygen concentration were decreased, lambda (λ) control tends to increase the air-fuel ratio of the fuel mixture provided to the engine 1, so the signal VRO2 may take values of greater than or equal to a predetermined value C as shown by a curve 1 or a curve 3 in the figure. Conversely, when the signal VFAF deviates as if the oxygen concentration were increased, lambda (λ) control tends to decrease the air-fuel ratio of the fuel mixture provided to the engine 1, so the signal VRO2 may take values of less than or equal to a predetermined value D as shown by a curve 2 or a curve 4 in the figure. In this manner, the accuracy of a determination of the gaseous environment of the catalyst based on the output of the oxygen sensor 13 is adversely affected.

In order to cancel out such an adverse effect, the control unit 2 determines whether or not there is a deviation in the output of the universal exhaust gas oxygen sensor 3, and when there is a deviation, a deviation correction is added to the signal VFAF input from the universal exhaust gas oxygen sensor 3.

Figure 10:
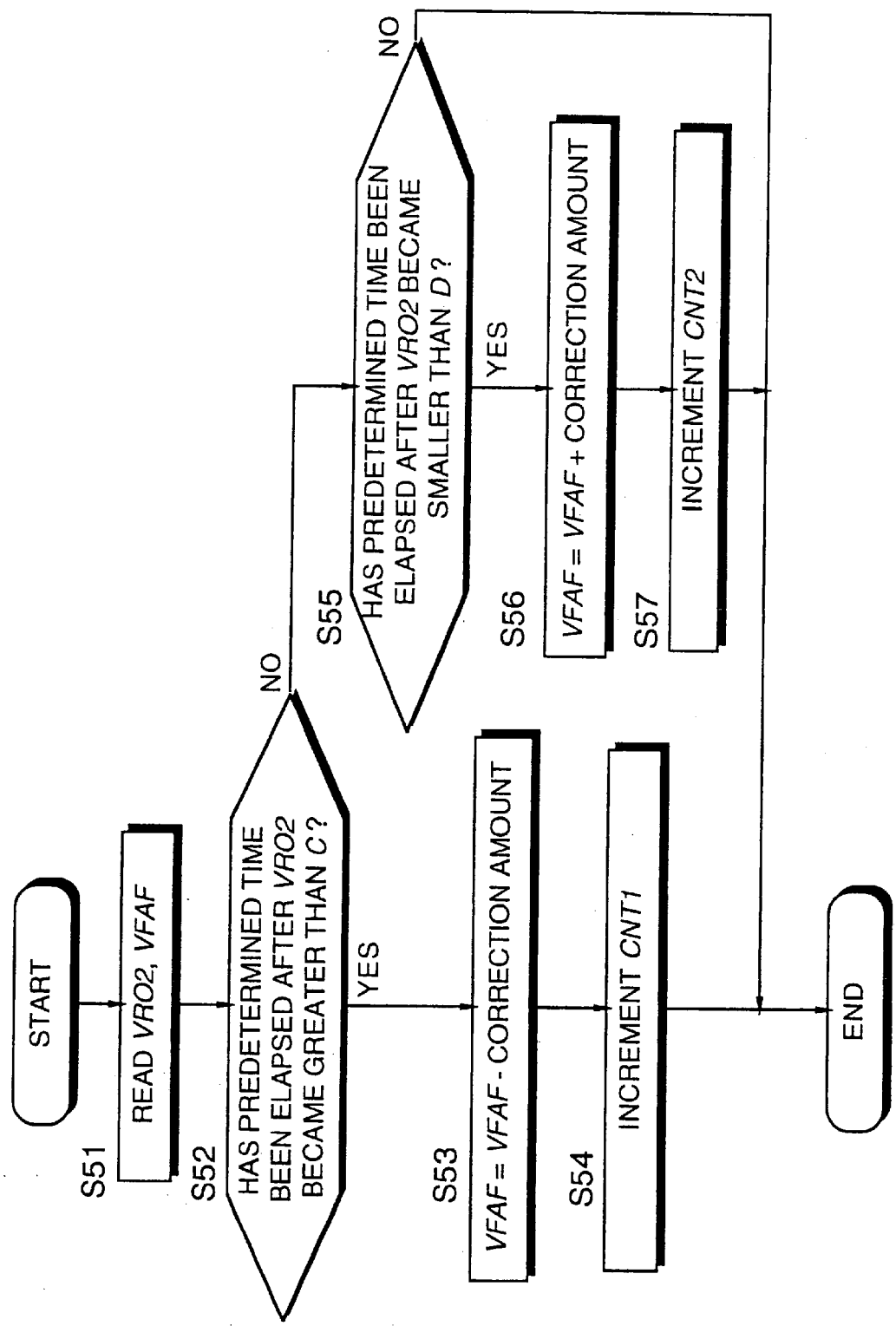
FIG. 10 is a flowchart showing a routine for correction of deviations in the output of the universal exhaust gas oxygen sensor performed by the control unit.

Referring to FIG. 10, the deviation correction routine executed by the control unit 2 will be described. This routine is executed at intervals of 10 milliseconds.

In step S51, the signal VRO2 input from the oxygen sensor 13 and VFAF the signal VFAF input from the universal exhaust gas oxygen sensor 3 are read.

In a following step S52, it is determined if a predetermined time has elapsed after VRO2 has taken a value greater than the predetermined value C. When this condition is established, it is determined that a deviation has occurred in the signal VFAF in a direction of an increase in the oxygen concentration. In this case, in step S53, a value resulting from the predetermined correction amount being subtracted from the signal VFAF is reset as the signal VFAF. As explained earlier, the signal VFAF represents lower oxygen concentrations by lower values and higher oxygen concentrations by higher values. When the signal VFAF becomes smaller, lambda ($\lambda$) control tends to increase the air-fuel ratio of the fuel mixture provided to the engine 1. As a result, the signal VRO2 returns to the stoichiometric range.

Next in step S54, a deviation correction occurrence counter CNT1 is incremented and the routine is terminated. The deviation correction occurrence counter CNT1 is initially set to a value of zero when starting the engine 1.

When the condition in step S52 is not established, the routine proceeds to step S55 where it is determined if a predetermined time has elapsed after the output VRO2 has taken a value less than the predetermined value D. When this condition is established, it is determined that a deviation has occurred in the signal VFAF in a direction of a decrease in the oxygen concentration. In this case, in step S56, a value resulting from a predetermined correction amount being added to the signal VFAF is reset as the signal VFAF. Next in step S57, a deviation correction occurrence counter CNT2 is incremented and the routine is terminated. The deviation correction rotation occurrence CNT2 is initially set to a value of zero when starting the engine 1. The counter values CNT1 and CNT2 are stored in the memory (RAM) of the control unit 2.

In the determination routine of the calculation conditions as shown in FIG. 8, in step S46, it is determined whether or not both of the two counter values CNT1 and CNT2 are less than the predetermined number. If either value is greater than or equal to the predetermined number, in step S48, the calculation permission flag is reset to a value of zero. The deviation correction routine shown in FIG. 10 is used not only for correcting deviations of the output of the universal exhaust gas oxygen sensor 3, but also for obtaining data in order to determine whether or not the calculation conditions for the oxygen storage capacity HOSCy of the precious metal in the catalyst are established.

When deviation correction of the output of the universal exhaust gas oxygen sensor 3 is frequently performed, there is the possibility that the universal exhaust gas oxygen sensor 3 will develop some type of malfunction. Under these conditions, it is possible to remove one possible cause of deviations in the calculation of the oxygen storage capacity HOSCy by preventing the calculation of the oxygen storage amount of the precious metals in the catalyst under such conditions.

As shown in this embodiment, when the exhaust air fuel ratio is almost stoichiometric downstream from the catalyst and richer than stoichiometric upstream therefrom, the release amount of oxygen released from the catalyst in one calculation cycle (e.g. 10 ms) is calculated by multiplying the deficient oxygen amount in the cycle (i.e. FO2×Q×t) and the constant aR, which represents the release rate of the oxygen stored in the catalyst (S28). Also, when the exhaust air fuel ratio is almost stoichiometric downstream from the catalyst and lean of stoichiometric upstream therefrom, the storage amount of oxygen stored from the catalyst in one calculation cycle (e.g. 10 ms) is calculated by multiplying the excess oxygen amount in the cycle (i.e. FO2×Q×t) and the constant aL, which represents the storage rate of the oxygen flowing to the catalyst (S29).

However, for the ease of calculation, both of these values (i.e. the release amount of oxygen released from the catalyst in one calculation cycle and the storage amount of oxygen stored from the catalyst in one calculation cycle) can alternatively be set to a fixed value, being the same as each other. It means that the values "aR×FO2×Q×t" in the step S28 and "aL×FO2×Q×t" in the step S29, both of which are shown in FIG. 6, can be set to the same, fixed value.

Usually, the deviation of the output of the universal exhaust gas oxygen sensor and the O2 sensor, and the error amount of the air fuel ratio control can be simply represented by the difference between the time lengths taken in the period in which the exhaust air fuel ratio is almost stoichiometric downstream from the catalyst and rich of stoichiometric upstream therefrom (such as the period from t1 to t2 as shown in FIG. 7A) and in the period in which the exhaust air fuel ratio is almost stoichiometric downstream from the catalyst and lean of stoichiometric upstream therefrom (such as the period from t3 to t4 as shown in FIG. 7A). Thus, when it is accurate enough to calculate RMAX and LMAX by using only these time lengths, the release amount of oxygen released from the catalyst in one calculation cycle and the storage amount of oxygen stored from the catalyst in one calculation cycle can be just a same, fixed value. Of course these fixed value can be adequately adjusted, according to the experimental result in order to improve the accuracy.

FIG. 7B shows the transition of HOSCRn and HOSCLn in the case of using the alternative described above. As shown in the figure, HOSCRn and HOSCLn increase at the same and constant rate. It is understood that LMAX becomes larger than RMAX because the time length from t3 to t4 is longer than that from t1 to t2.

In the determination routine for calculation conditions shown in FIG. 8, the calculation of the oxygen storage capacity HOSCy is not, in this embodiment, permitted in when the operation of the engine enters any one of a predetermined high engine speed region, low engine speed region, high engine load region or low engine load region. However, it is possible to allow the calculation of the oxygen storage capacity HOSCy under these operational conditions if so desired. In the same manner, when a catalyst is used which operates under the low temperatures before completion of engine warm-up, the calculation of the oxygen storage capacity HOSCy may be permitted before completion of engine warm-up.

In step S46, instead of determining whether or not the deviation occurrences are less than the predetermined number of times, it is of course possible to compare an integral value of the correction value with a predetermined value and thus arrive at the same result.

In order to calculate the oxygen storage capacity HOSCy, it is necessary to sample the maximum value LMAX for the oxygen storage amount and the maximum value RMAX for the oxygen release amount of the precious metal in the catalyst. Nevertheless, it is sometimes occurs that the output of the oxygen sensor 13 consistently remains between slice levels LSL and RSL. Hence, it becomes necessary to forcibly induce the air-fuel ratio of the fuel mixture supplied to the engine 1 to become either or both of rich or lean in order to calculate the oxygen storage capacity HOSCy.

One method of forcibly making the air-fuel ratio of the fuel mixture supplied to the engine 1 rich or lean is disclosed in Tokkai Hei 9-222010 published by the Japanese Patent Office in 1997. The arrangement disclosed in this document is such that it is determined whether or not a catalyst, which forms part of an exhaust purification system, is active or not. In accordance with this determination the air-fuel ratio is oscillated alternatively from rich to lean before the catalyst is active. The magnitude of the oscillation amplitude is determined in accordance with the oxygen storage capacity of the catalyst.

This arrangement can be readily adapted to meet the above requirements by monitoring the frequency with which the slice levels LSL and RSL are exceeded and which, upon the frequency falling below a predetermined number, induces a lean mixture until saturation is detected followed by a rich mixture until depletion is sensed. With this the necessary averaging on which the target value is set can be derived and used.

Second Embodiment

In this second embodiment, the oxygen storage amount of the catalyst 10 is, as alluded to above, deemed partitioned into a high speed component (amount) HOSCn which is stored and released by a noble metal (Pt, Rh, Pd), in the catalyst and a low speed component (amount) LOSCn which is stored and released by an oxygen storage material in the catalyst 10. The low speed component LOSCn represents the storage and release of a larger amount of oxygen than the high speed component HOSCn, but its storage/release rate is, for reasons alluded to above, slower than that of the high speed component HOSCn.

Further, this high speed component HOSCn and low speed component LOSCn have characteristics that are modeled as follows:

When oxygen is stored, oxygen is stored preferentially as the high speed component HOSCn, and begins to be stored as the low speed component LOSCn only when the high speed component HOSCn has reached a maximum capacity HOSCnMAX (c.f. HOSCy supra), and oxygen can no longer be stored as the high speed component HOSCn.

When oxygen is released, and the ratio of the low speed component LOSCn to the high speed component HOSCn (LOSCn/HOSCn) is less than a predetermined value, i.e. when the high speed component is relatively large, oxygen is preferentially released from the high speed component HOSCn. When the ratio of the low speed component LOSCn to the high speed component HOSCn is larger than the predetermined value, oxygen is released from both the high speed component HOSCn and low speed component LOSCn so that the ratio of the low speed component LOSCn to the high speed component HOSCn does not vary.

Figure 11:
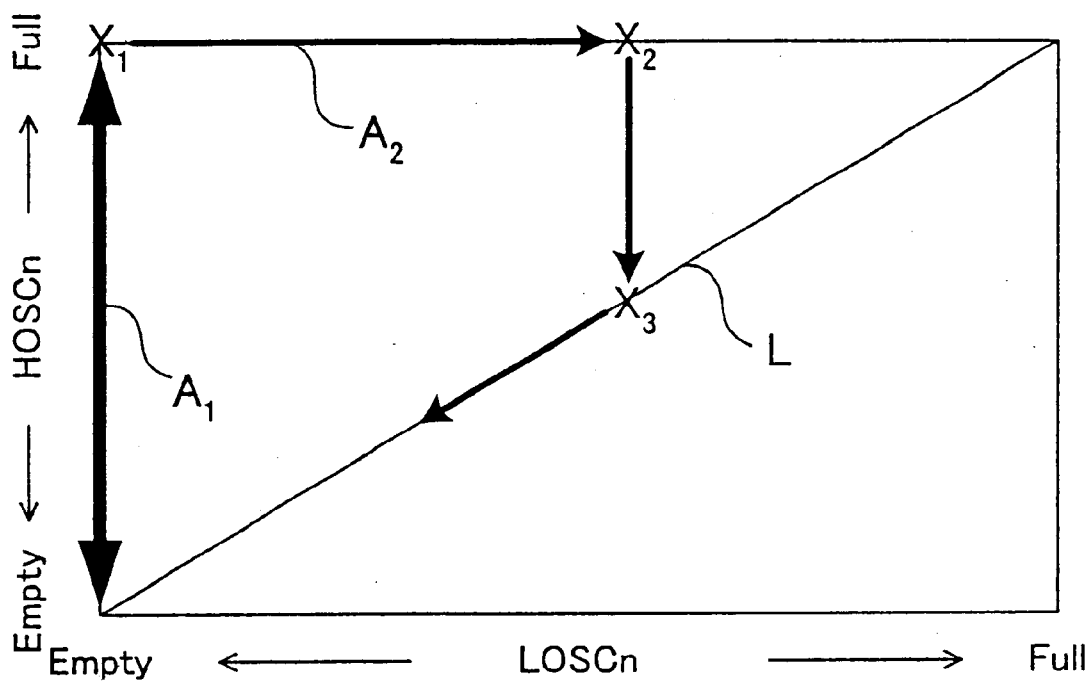
FIG. 11 is a diagram showing the oxygen release characteristics of a catalyst upon which second and third embodiments of the invention are based.

FIG. 11 shows the oxygen storage/release characteristics of the catalyst. The vertical axis shows the high speed component HOSCn (oxygen amount stored on the noble metal) and the horizontal axis shows the low speed component LOSCn (oxygen stored in the oxygen storage material).

Under normal running conditions, the low speed component LOSCn is almost zero and only the high speed component HOSCn varies according to the air-fuel ration of the exhaust flowing into the catalyst as shown by arrow $A_1$ in FIG. 11. The high speed component HOSCn is normally controlled, for example, to be half of its maximum capacity.

However, when an engine "fuel-cut" is performed or when the engine has restarted from a warmed-up state (i.e. a hot restart), the high speed component HOSCn reaches a maximum value and oxygen is then stored as the low speed component LOSCn (see arrow $A_2$ in FIG. 11). the oxygen storage amount varies from the point $X_1$ to the point $X_2$.

When oxygen is released at point $X_2$, it is preferentially released in the form of the high speed component HOSCn. When the ratio of the low speed component LOSCn to the high speed component HOSCn (viz., LOSCn/HOSCn) reaches the predetermined value ($X_3$ in FIG. 11), oxygen is released from both the noble metal and the oxygen storage material in the form of both high speed and low speed components LOSCn, HOSCn in a manner wherein the ratio of the low speed component to the high speed component does not vary. That is to say, oxygen is released in accordance with the straight line trace L. In this instance, the trace L depicts a situation wherein the ratio of the low speed component to the high speed component is 5~15 (preferably 10):1.

The controller 2 computes the oxygen storage amount of the catalyst 10 (high speed component HOSCn and low speed component LOSCn) based on the output of the air flow meter 6, front A/F sensor 3 and cooling water temperature sensor 11.

When the high speed component HOSCn of the computed oxygen storage amount is greater than a predetermined amount, for example, half the maximum capacity HOSCnMAX of the high speed component, the controller 6 makes the air fuel ratio of the engine 1 rich thus making the air-fuel ratio of the exhaust flowing into the catalyst 10 rich and decreasing the high speed component HOSCn. Conversely, when the high speed component HOSCn is less than the predetermined amount, the controller 6 makes the air fuel ratio of the engine 1 lean thus making the air-fuel ratio of the exhaust flowing into the catalyst 10 lean and increasing the high speed component HOSCn.

A discrepancy may arise between the computed oxygen storage amount and real oxygen storage amount due to computational error. In this case the controller 6 resets the computational value of the oxygen storage amount with a predetermined timing based on the air-fuel ratio of the exhaust downstream of the catalyst 10, and corrects this discrepancy from the real oxygen storage amount.

Specifically, when it is determined that the air-fuel ratio downstream of the catalyst 10 is lean based on the output of the rear oxygen sensor 5, it is determined that at least the high speed component HOSCn has reached a maximum. In this case the high speed component HOSCn is reset to maximum capacity. When it is determined by the rear oxygen sensor 5 that the air fuel ratio downstream of the catalyst 10 is rich, oxygen is no longer being released from either the high speed component HOSCn or the low speed component LOSCn. In this case the high speed component HOSCn and low speed component LOSCn are reset to minimum capacity.

Next, the control performed by the controller 6 will be described.

The estimation and computation of the oxygen storage amount will first be described, followed by resetting of the computational value of the oxygen storage amount, and finally air-fuel ratio control of the engine 1 based on the oxygen storage amount.

Figure 12:
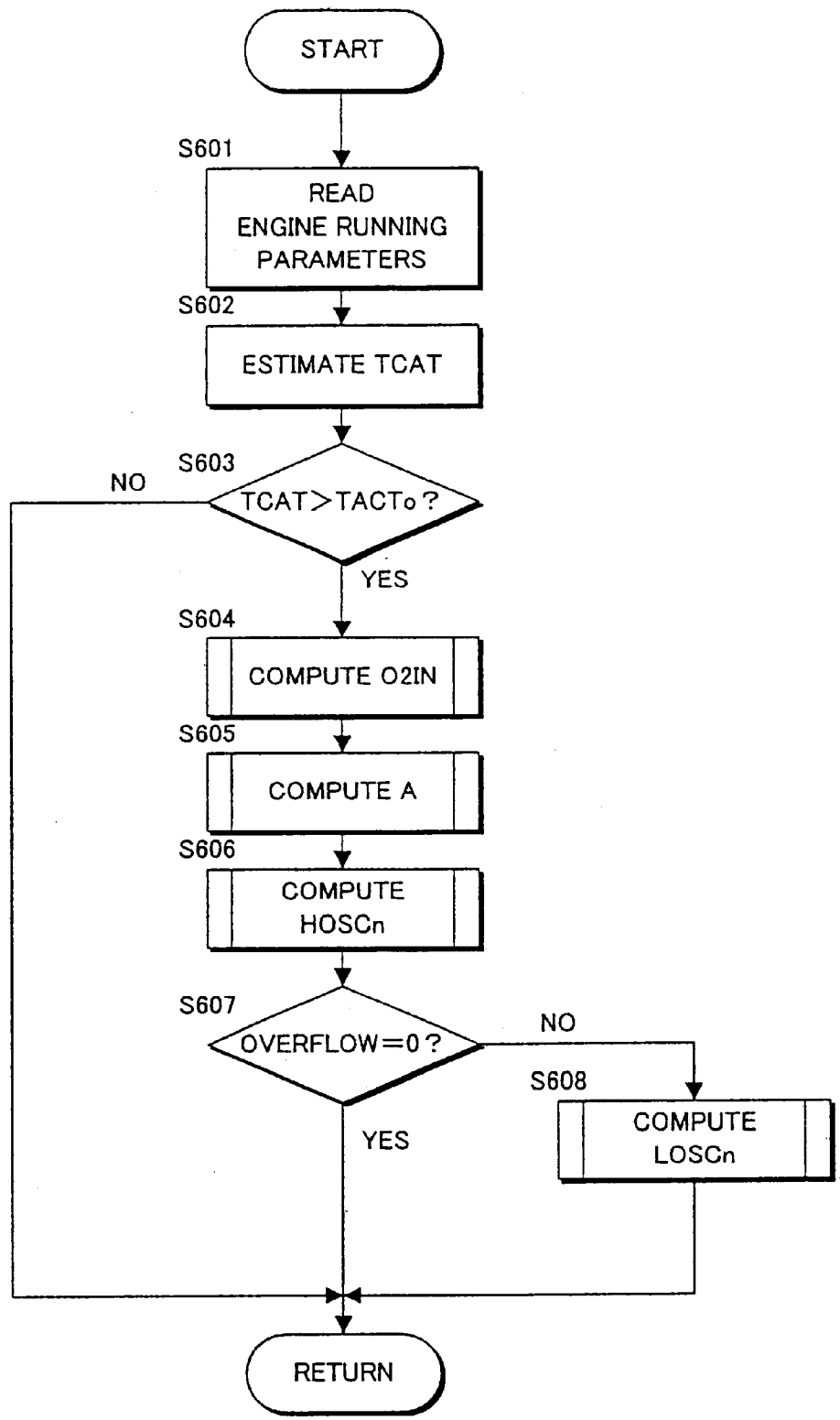
FIG. 12 is a flowchart showing a routine for computing an oxygen storage amount of the catalyst which takes overflow from one storage material to another into account.

FIG. 12 shows a main routine for computing or estimating the oxygen storage amount of the catalyst 10. This computation is performed at predetermined intervals by the controller 6.

According to this routine, first, in a step S601, the outputs of the cooling water temperature sensor 10, crank angle sensor 12 and air flow meter 9 are read as running parameters of the engine 1. In a step S602, a temperature TCAT of the catalyst 10 is estimated based on these parameters. In a step S603, by comparing the estimated catalyst temperature TCAT and a catalyst activation temperature TACTo (e.g. 300° C.), it is determined whether or not the catalyst 10 has been activated.

When it is determined that the catalyst activation temperature TACTo has been reached, the routine proceeds to a step S604 to compute the oxygen storage amount of the catalyst 10. When it is determined that the catalyst activation temperature TACTo has not been reached, processing is terminated because in this case it is assumed that the catalyst 10 does not store or release oxygen.

In the step S604, a subroutine (FIG. 13) for computing an oxygen excess/deficiency amount O2/N is performed, and the oxygen excess/deficiency amount of the exhaust flowing into the catalyst 10 is computed. In a step S605, a subroutine (FIG. 14) for computing an oxygen release rate A of the high speed component of the oxygen storage amount is performed, and the oxygen release rate A of the high speed component is computed.

Further, in a step S606, a subroutine (FIG. 15) for computing the high speed component HOSCn of the oxygen storage amount is performed. In this step, the high speed component HOSCn and an oxygen amount OVERFLOW overflowing into the low speed component LOSCn without being stored as the high speed component HOSCn are computed based on the oxygen excess/deficiency amount O2/N and the oxygen release rate A of the high speed component.

In a step S607, it is determined whether or not all of the oxygen excess/deficiency amount O2/N flowing into the catalyst 10 has been stored as the high speed component HOSCn based on the overflow oxygen amount OVER-FLOW. When all of the oxygen excess/deficiency amount O2/N has been stored as the high speed component (i.e., OVERFLOW=0), processing is terminated. Otherwise, the routine proceeds to a step S608, a subroutine (FIG. 16) is performed for computing the low speed component LOSCn, and the low speed component LOSCn is computed based on the overflow oxygen amount OVERFLOW overflowing from the high speed component HOSCn.

Here, the catalyst temperature TCAT is estimated from the cooling water temperature of the engine 1, the engine load and the engine rotation speed. Alternatively a temperature sensor 12 may also be used in conjunction with the catalyst 10 as shown in FIG. 1, and the temperature of the catalyst 10 measured directly.

When the catalyst temperature TCAT is less than the activation temperature TACTo, the oxygen storage amount is not computed in the routine depicted in 4. Alternatively, the step S603 may be eliminated, and the effect of the catalyst temperature TCAT may be reflected in the oxygen release rate A of the high speed component or an oxygen storage/release rate B of the low speed component, described later.

Figure 13:
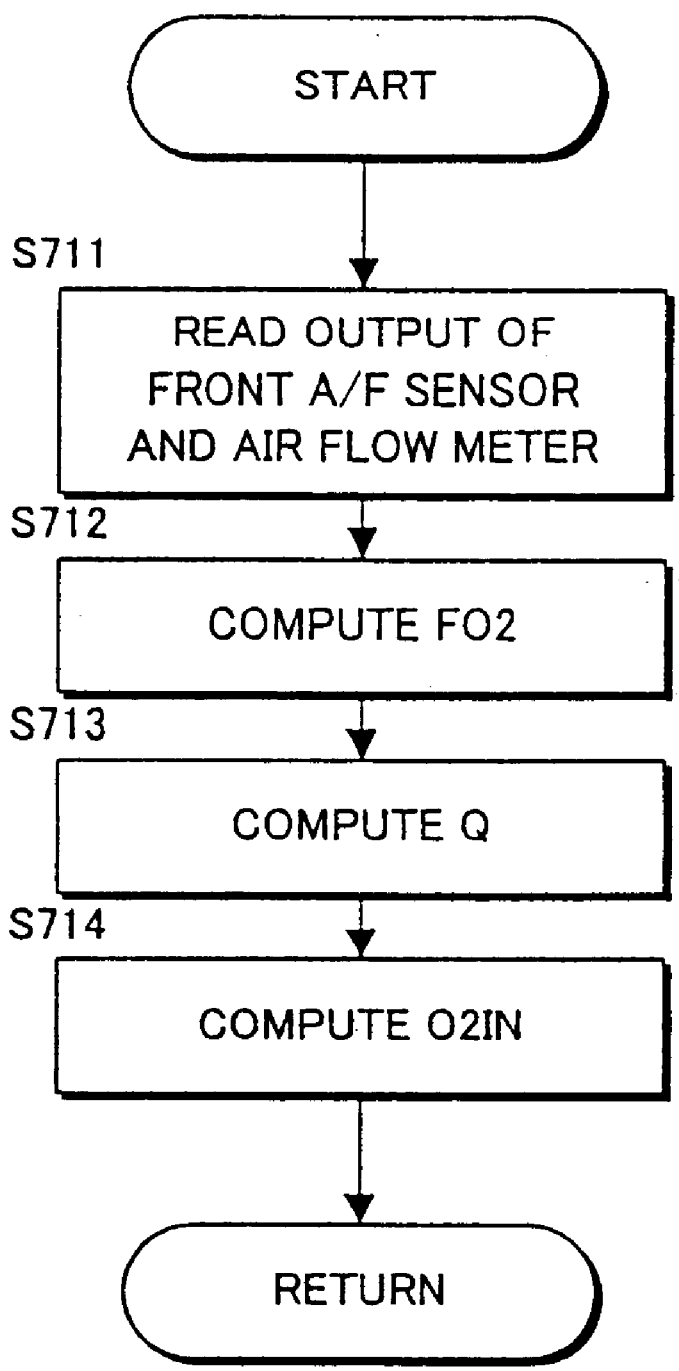
FIG. 13 is a flowchart showing a subroutine for computing an oxygen excess/deficiency amount in exhaust flowing into the catalyst in accordance with the second embodiment of the invention.

Next, subroutines performing steps S604 to S606 and step S608 will be described. FIG. 13 shows the subroutine for computing the oxygen excess/deficiency amount O2/N of the exhaust flowing into the catalyst 10. In this subroutine, the oxygen excess/deficiency amount O2/N of the exhaust flowing into the catalyst 10 is computed based on the air-fuel ratio of the exhaust upstream of the catalyst 10 and the intake air amount of the engine 1. First, in a step S711, the output of the front A/F sensor 3 and the output of the air flow meter 6 are read.

Next, in a step S712, the output of the front A/F sensor 3 is converted to an excess/deficiency oxygen concentration FO2 of the exhaust flowing into the catalyst 10 using a predetermined conversion table. Here, the excess/deficiency oxygen concentration FO2 is a relative concentration relative to the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S713, the output of the air flow meter 9 is converted to an intake air amount (Q×t) using a predetermined conversion table, where Q=exhaust gas flow rate represented by intake air flow rate, and t=cycle time. In a step S714, the intake air amount (Q×t) is multiplied by the excess/deficiency oxygen concentration FO2 to compute the excess/deficiency oxygen amount O2/N of the exhaust flowing into the catalyst 10.

As the excess/deficiency oxygen concentration FO2 has the above characteristics, the excess/deficiency oxygen amount O2/N is zero when the exhaust flowing into the catalyst 10 is at the stoichiometric air-fuel ratio, a negative value when it is rich, and a positive value when it is lean.

Figure 14:
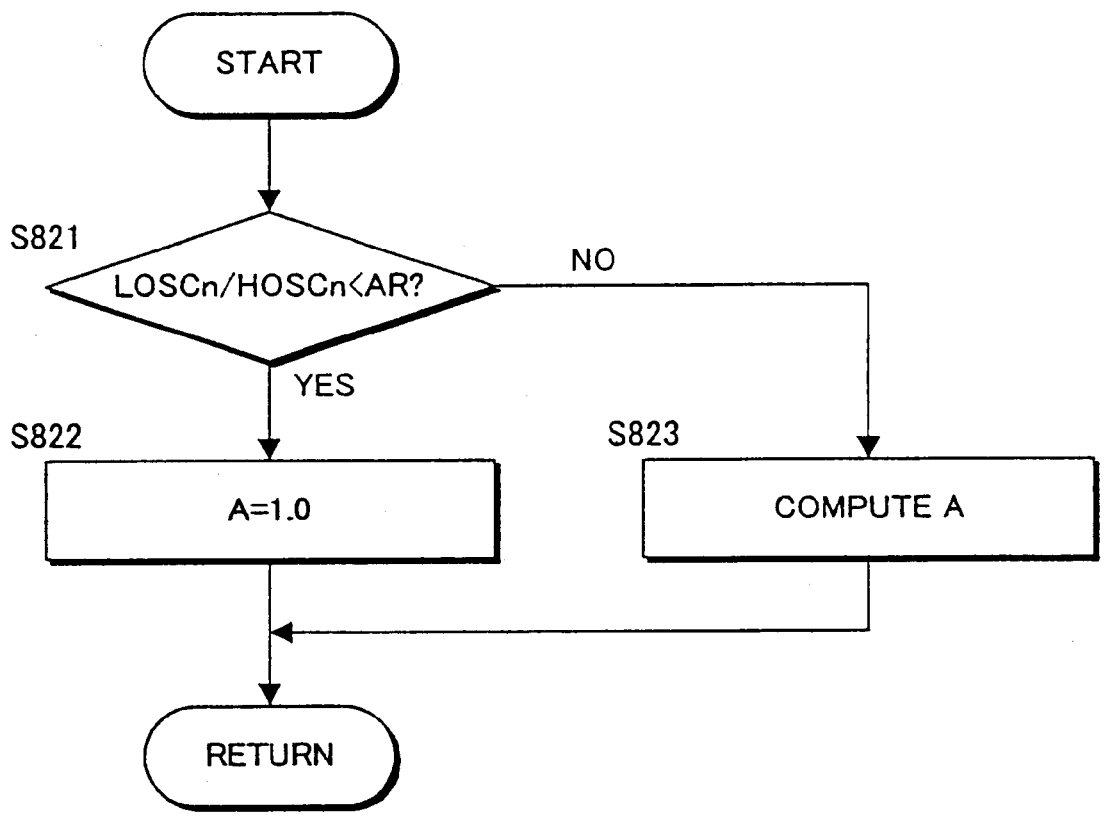
FIG. 14 is a flowchart showing a subroutine for computing an oxygen release rate of a high speed component in accordance with the second embodiment of the invention.

FIG. 14 shows a subroutine for computing the oxygen release rate A of the high speed component of the oxygen storage amount. In this subroutine, the oxygen release rate of the high speed component HOSCn is presumed to be affected by the low speed component LOSCn, and the oxygen release rate A of the high speed component is computed taking into account the low speed component LOSCn.

First, in a step S821, it is determined whether or not a ratio LOSCn/HOSCn of low speed component relative to the high speed component is less than a predetermined threshold value AR (e.g. AR=10). When it is determine that the ratio LOSCn/HOSCn is less than the predetermined value AR, i.e., when the high speed component HOSCn is relatively large compared with the low speed component LOSCn, the routine proceeds to a step S822, and the oxygen release rate A of the high speed component is set to 1.0 expressing the fact that oxygen is released only from the high speed component HOSCn.

On the other hand, when it is determined that the ratio LOSCn/HOSCn is not less than the predetermined threshold value AR, oxygen is released from the high speed component HOSCn and the low speed component LOSCn so that the ratio of the low speed component LOSCn to the high speed component HOSCn does not vary. The routine then proceeds to a step S823, and a value of the oxygen release rate A of the high speed component is computed which does not cause the ratio LOSCn/HOSCn to vary.

Figure 15:
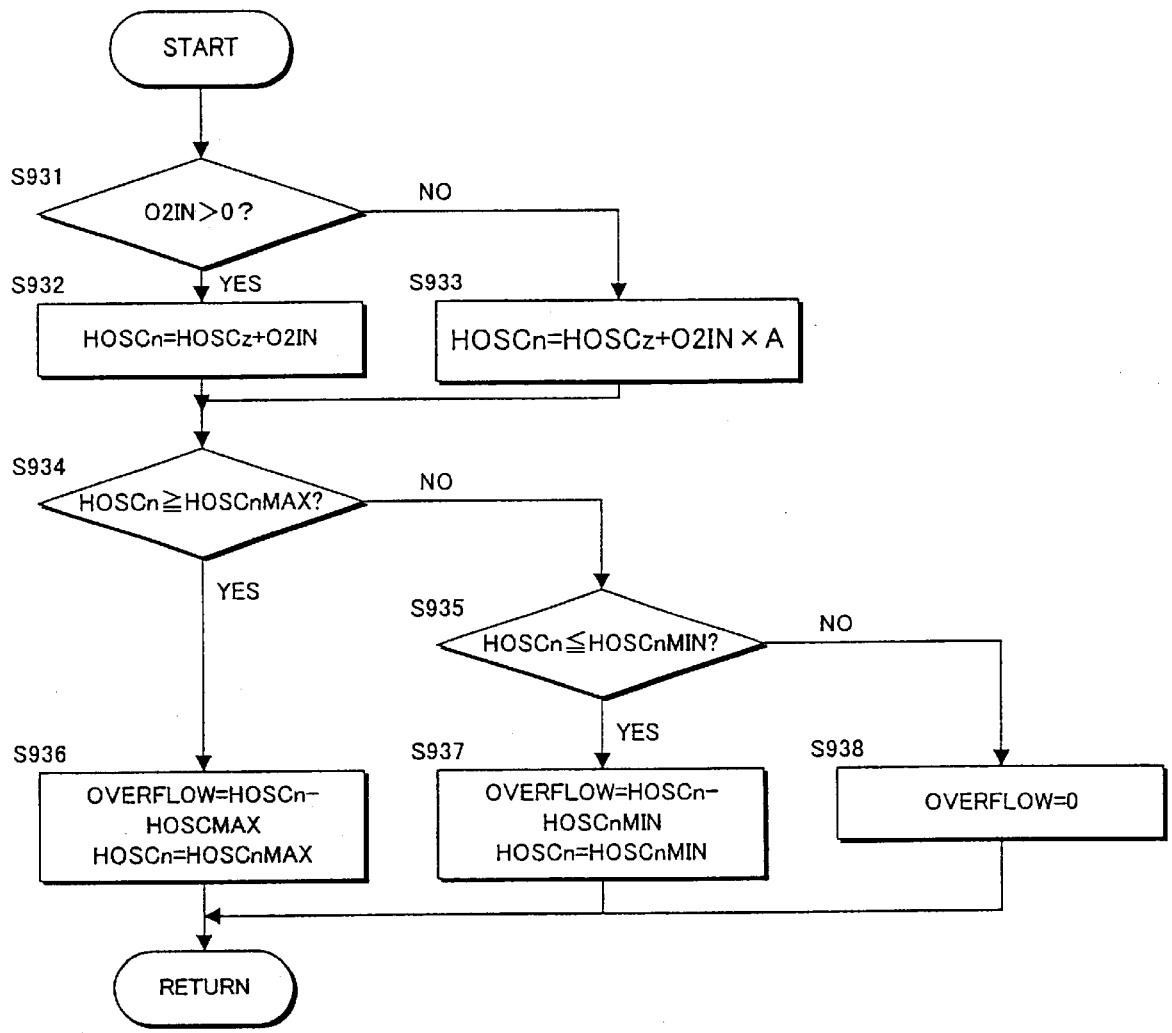
FIG. 15 is a flowchart showing a subroutine for computing the high speed component of the oxygen storage amount in accordance with the second embodiment.

FIG. 15 shows a subroutine for computing the high speed component HOSCn of the oxygen storage amount. In this subroutine, the high speed component HOSCn is computed based on the oxygen excess/deficiency amount O2/N of the exhaust flowing into the catalyst 10 and the oxygen release rate A of the high speed component.

First, it is determined in a step S931 whether or not the high speed component HOSCn is being stored or is being released based on the oxygen excess/deficiency amount O2/N.

When the air-fuel ratio of the exhaust flowing into the catalyst 10 is lean and the oxygen excess/deficiency amount O2/N is thus larger than zero, it is determined that the high speed component HOSCn is being stored. The routine then proceeds to a step S932, and the high speed component HOSCn is computed or estimated from the following equation (13):

$$HOSCn = HOSCz + O2/N \tag{13}$$

where:

O2/N=FO2×Q×t,

HOSCz=value of high speed component HOSCn on the immediately preceding occasion.

Thus, in this case the high speed component HOSCn increases by the oxygen excess/deficiency amount O2/N.

On the other hand, when it is determined that the oxygen excess/deficiency amount O2/N is less than zero and the high speed component is being released, the routine proceeds to a step S933, and the high speed component HOSCn is computed from the following equation (14):

$$HOSCn = HOSCz + O2/N \times A \quad (14)$$

where:

A=oxygen release rate of the high speed component HOSCn.

In steps S934, S935, it is determined whether or not the computed HOSCn exceeds the maximum capacity HOSCnMAX of the high speed component, or whether or not it is less than a minimum capacity HOSCnMIN.

When the high speed component HOSCn is greater than the maximum capacity HOSCnMAX, the routine proceeds to a step S936, and the overflow oxygen amount (excess amount) OVERFLOW flowing into the catalyst without being stored as the high speed component HOSCn is computed from the following equation (15):

$$OVERFLOW = HOSCn - HOSCnMAX \quad (15)$$

In this case the high speed component HOSCn is limited to the maximum capacity HOSCnMAX.

When the high speed component HOSCn is less than the minimum capacity HOSCnMIN, the routine proceeds to a step S937, and the overflow oxygen amount (deficiency amount) OVERFLOW which was not stored as part of the high speed component HOSCn is computed by the following equation (16):

$$OVERFLOW = HOSCn - HOSCnMIN \quad (16)$$

In this case the high speed component HOSCn is limited to the minimum capacity HOSCnMIN. Here, zero is given as the minimum capacity HOSCnMIN, so the oxygen amount which is deficient when all the high speed component HOSCn has been released is computed as a negative overflow oxygen amount.

When the high speed component HOSCn lies between the maximum capacity HOSCnMAX and minimum capacity HOSCnMIN, the oxygen excess/deficiency amount O2/N of the exhaust flowing into the catalyst 10 is all stored as the high speed component HOSCn, and zero is set to the overflow oxygen amount OVERFLOW.

When the high speed component HOSCn is greater than the maximum capacity HOSCnMAX or less than the minimum capacity HOSCnMIN, the overflow oxygen amount OVERFLOW which has overflowed from the high speed component HOSCn is stored as the low speed component LOSCn.

Figure 16:
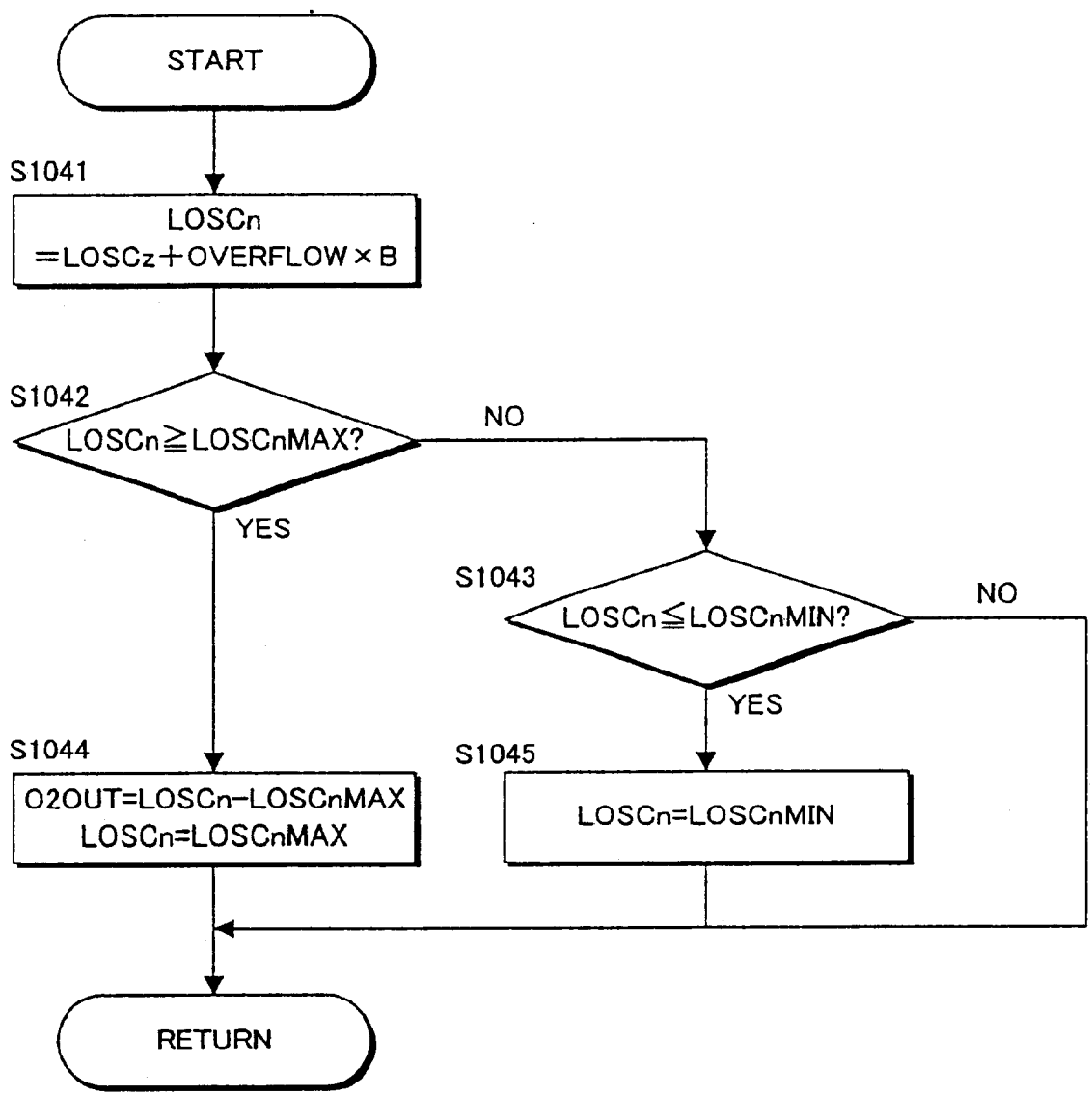
FIG. 16 is a flowchart showing a subroutine for computing a low speed component of the oxygen storage amount in accordance with the second embodiment.

FIG. 16 shows a subroutine for computing the low speed component LOSCn of the oxygen storage amount. In this subroutine, the low speed component LOSCn is computed based on the overflow oxygen amount OVERFLOW which has overflowed from the high speed component HOSCn.

According to this subroutine, in a step S1041, the low speed component LOSCn is computed by the following equation (17):

$$LOSCn = LOSCz + OVERFLOW \times B \quad (17)$$

where:

LOSCz=the immediately preceding value of the low speed component LOSCn, and

B=the oxygen storage/release rate of the low speed component.

Here, the oxygen storage/release rate B of the low speed component is set to a positive value less than 1, but actually has different characteristics for storage and release. Further, the real storage/release rate is affected by the catalyst temperature TCAT and the low speed component LOSCn, so the storage rate and release rate can be set to vary independently. In this case, when the overflow oxygen amount OVERFLOW is positive, oxygen is in excess, and the oxygen storage rate at this time is set to, for example, a value which is larger the higher the catalyst temperature TCAT or the smaller the low speed component LOSCn. Also, when the overflow oxygen amount OVERFLOW is negative, oxygen is deficient, and the oxygen release rate at this time may for example be set to a value which is larger the higher the catalyst temperature TCAT or the larger the low speed component LOSCn.

In steps S1042, S1043, in the same way as when the high speed component HOSCn is computed, it is determined whether or not the computed low speed component LOSCn has exceeded a maximum capacity LOSCnMAX or is less than a minimum capacity LOSCnMIN, such as zero, for example.

When maximum capacity LOSCnMAX is exceeded, the routine proceeds to a step S1044, an oxygen excess/deficiency amount O2OUT which has overflowed from the low speed component LOSCn is computed from the following equation (18):

$$LOSCnOUT = LOSCn - LOSCnMAX \quad (18)$$

and the low speed component LOSCn is limited to the maximum capacity LOSCnMAX. The oxygen excess/deficiency amount O2OUT flows out downstream of the catalyst 10.

When the low speed component LOSCn is less than the minimum capacity LOSCnMIN, the routine proceeds to a step S1045, and the low speed component LOSCn is limited to the minimum capacity LOSCnMIN.

Next, the resetting of the computed value of the oxygen storage amount performed by the controller 6 will be described. By resetting the computed or estimated value of the oxygen storage amount under predetermined conditions, computational errors which have accumulated so far are eliminated, and the computational precision of the oxygen storage amount can be improved.

Figure 17:
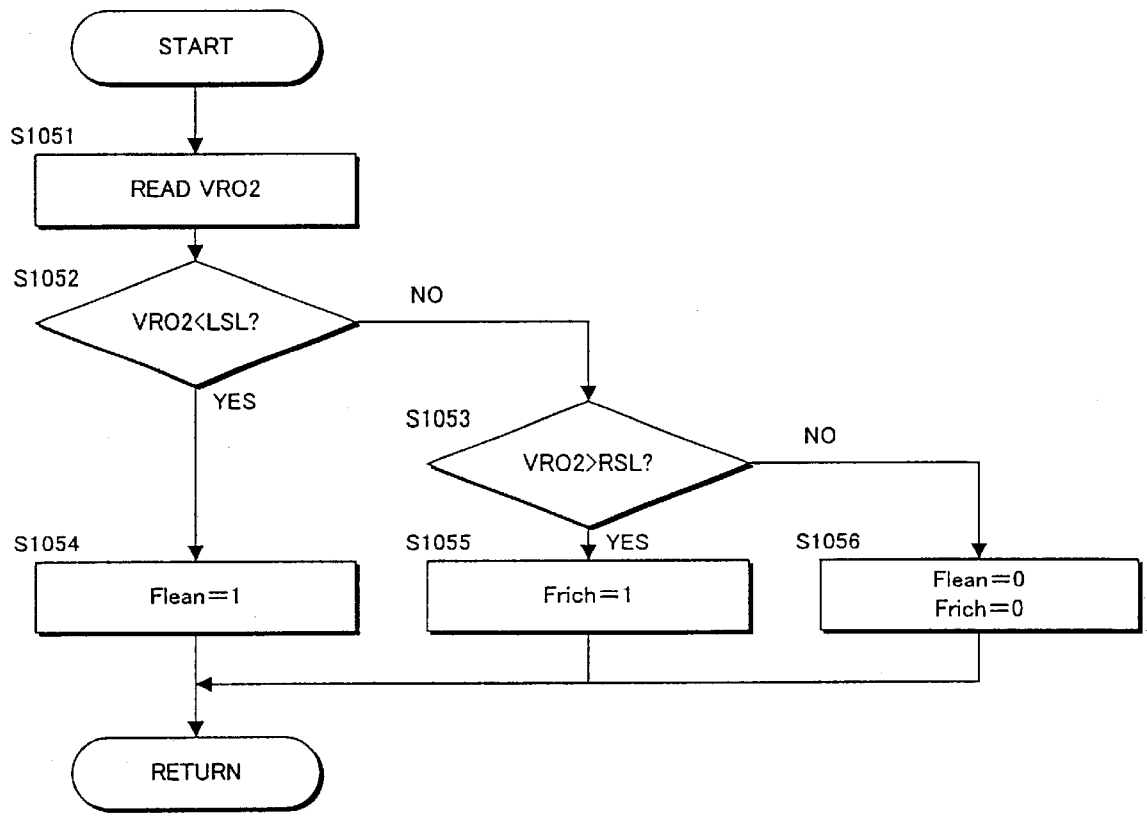
FIG. 17 is a flowchart showing a routine for determining a reset condition.

FIG. 17 shows the details of a routine for determining the reset condition. This routine determines whether or not a condition for resetting the oxygen storage amount (high speed component HOSCn and low speed component LOSCn) holds from the exhaust air-fuel ratio determined downstream of the catalyst 10, and sets a flag Frich and a flag Flean accordingly.

First, in a step S1051, the output of the rear oxygen sensor 5 which detects the exhaust air-fuel ratio downstream of the catalyst 10 is read. Subsequently, in a step S1052, the rear oxygen sensor output VRO2 is compared with a lean determining threshold LSL, and in a step S1053, the rear oxygen sensor output VRO2 is compared with a rich determining threshold RSL.

As a result of these comparisons, when the rear oxygen sensor output VRO2 is less than the lean determining threshold LSL, the routine proceeds to a step S1054, and the flag Flean is set to "1" indicating that the lean reset condition for the oxygen storage amount holds. On the other hand, when the rear oxygen sensor output VRO2 exceeds the rich determining threshold RSL, the routine proceeds to a step S1055, and the flag Frich is set to "1" indicating that the rich reset condition for the oxygen storage amount holds.

When the rear oxygen sensor output VRO2 lies between the lean determining threshold LSL and rich determining threshold RSL, the routine proceeds to a step S1056, and the flags Flean and Frich are set to "0" showing that the lean reset condition and rich reset condition do not hold.

Figure 18:
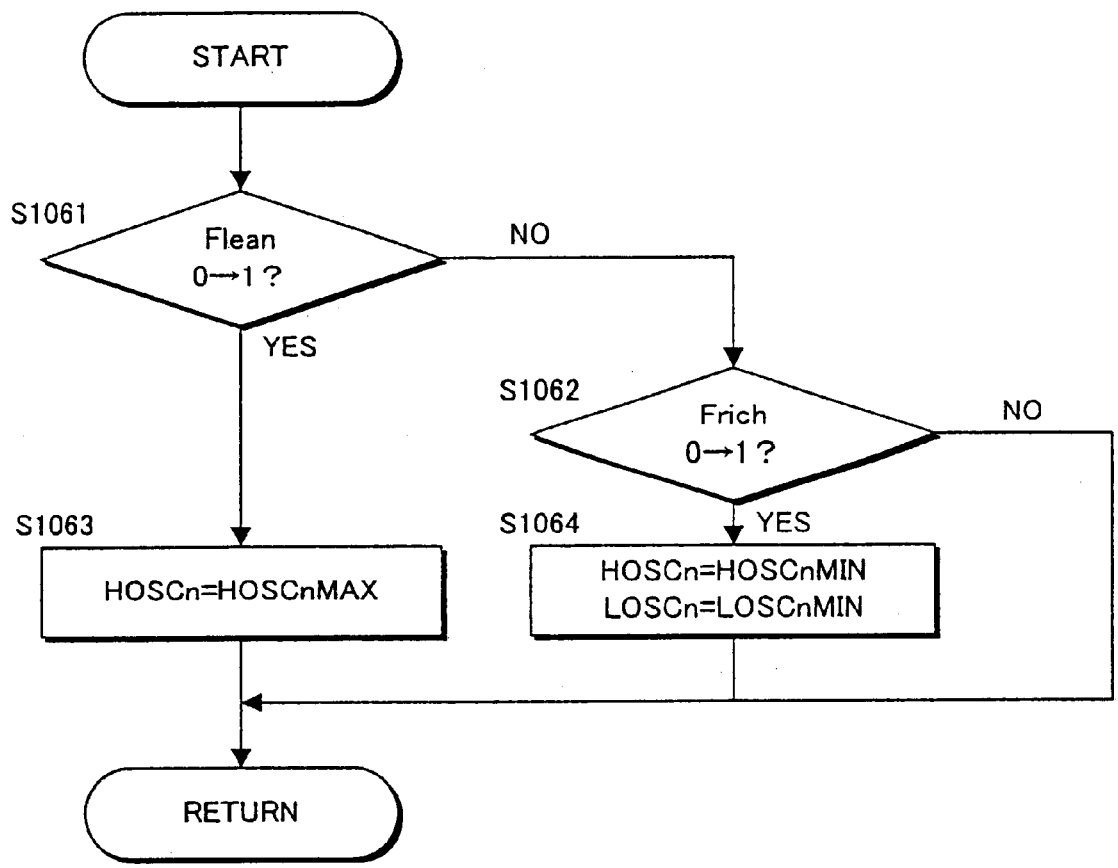
FIG. 18 is a flowchart showing a routine for performing reset of the computed oxygen storage amount.

FIG. 18 shows a routine for resetting the oxygen storage amount. According to FIG. 18, in steps S1061, S1062, it is determined whether or not the lean reset conditions or rich reset conditions hold based on the change of the values of the flags Flean and Frich.

When the flag Flean changes from "0" to "1", and it is determined that lean reset conditions hold, the routine proceeds to a step S1063, and the high speed component HOSCn of the oxygen storage amount is reset to the maximum capacity HOSCnMAX. At this time, resetting of the low speed component LOSCn is not performed. On the other hand, when the flag Frich changes from "0" to "1", and it is determined that rich reset conditions hold, the routine proceeds to a step S1064, and the high speed component HOSCn and low speed component LOSCn of the oxygen storage amount are respectively reset to the minimum capacities HOSCnMIN, LOSCnMIN.

The reason why resetting is performed as described above for the lean reset condition is that the oxygen storage rate of the low speed component LOSCn is slow, and the oxygen overflows downstream of the catalyst even if the low speed component LOSCn has not reached maximum capacity if the high speed component HOSCn has reached maximum capacity. In this case the exhaust air-fuel ratio downstream of the catalyst becomes lean, and it is presumed that at least the high speed component HOSCn has reached maximum capacity.

When the exhaust air fuel ratio downstream of the catalyst becomes rich, oxygen is not released from the low speed component LOSCn. Therefore, in this case it is presumed that both the high speed component HOSCn and low speed component LOSCn are at minimum capacity because no oxygen is being released.

Next, the air-fuel ratio control performed by the controller 6 (oxygen storage amount constant control) will be described.

Figure 19:
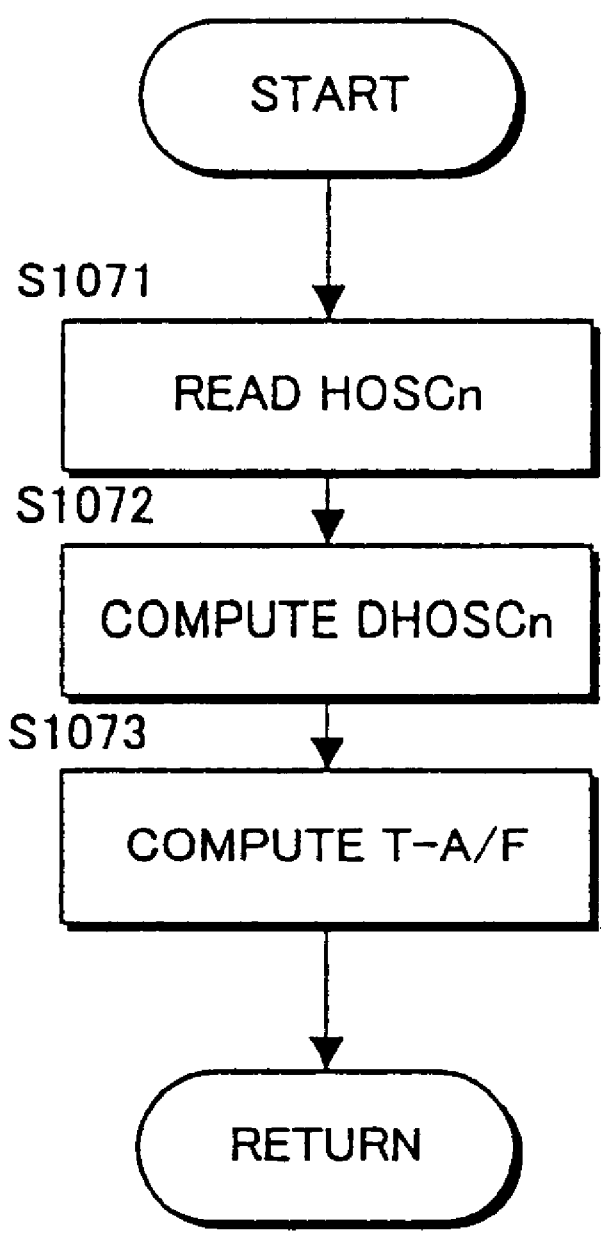
FIG. 19 is a flowchart showing a routine for computing a target air fuel ratio based on the oxygen storage amount.

FIG. 19 shows a routine for computing a target air fuel ratio based on the estimated or computed oxygen storage amount.

According to this, in a step S1071, the high speed component HOSCn of the present oxygen storage amount is read. In a step S1072, a deviation DHOSCn (=oxygen excess/deficiency amount required by catalyst 10) between the current high speed component HOSCn and a target value TGHOSCn of the high speed component, is computed. The target value TGHOSCn of the high speed component is set to, for example, half of the maximum capacity HOSCnMAX of the high speed component.

In a step S1073, the computed deviation DHOSCn is converted to an air-fuel ratio equivalent value, and a target air-fuel ratio T-A/F of the engine 1 is set.

Therefore, according to this routine, when the high speed component HOSCn of the oxygen storage amount is below a target amount, the target air fuel ratio of the engine 1 is set to lean, and the high speed component HOSCn of the oxygen storage amount is increased. On the other hand, when the high speed component HOSCn exceeds the target amount, the target air fuel ratio of the engine 1 is set to rich, and the high speed component HOSCn of the oxygen storage amount is decreased. In this way the high speed component is controlled by controlling the target air fuel ratio.

Next, the overall action performed by the above control will be described.

In an exhaust purification device according to this invention, computation of the oxygen storage amount of the catalyst 10 begins when the engine 1 starts, and the air-fuel ratio of the engine 1 is controlled so that the oxygen storage amount of the catalyst 10 remains constant with a view to maintaining a maximum conversion efficiency of the catalyst.

The oxygen storage amount of the catalyst 10 is estimated based on the measured air-fuel ratio of the exhaust gas flowing into the catalyst 10 and the intake air amount, and computation of the oxygen storage amount is divided into computation of a high speed component HOSCn and low speed component LOSCn according to the characteristics of these components.

The computation is performed according to a specific model of the characteristics of a high speed component and low speed component. Specifically, the computation is performed assuming that when oxygen is stored, the high speed component HOSCn is preferentially stored, and the low speed component LOSCn begins to be stored only when oxygen can no longer be stored as the high speed component HOSCn. The computation also assumes that when oxygen is released, and the ratio (LOSCn/HOSCn) of the low speed component LOSCn and high speed component HOSCn is less than a predetermined threshold value AR, oxygen is preferentially released from the high speed component HOSCn. When the ratio LOSCn/HOSCn reaches the predetermined value AR, oxygen is assumed to be released from both the low speed component LOSCn and high speed component HOSCn to maintain this ratio LOSCn/HOSCn constant.

When the high speed component HOSCn of the computed oxygen storage amount is larger than the target value, the controller 6 decreases the high speed component by controlling the air-fuel ratio of the engine 1 to be rich, and when it is less than the target value, the high speed component HOSCn is increased by controlling the air-fuel ratio to be lean.

As a result, the high speed component HOSCn of the oxygen storage amount is controlled to be at the target value. Thus, even if the air-fuel ratio of the exhaust flowing into the catalyst 10 shifts from the stoichiometric air-fuel ratio, oxygen is immediately stored as part of the high speed component HOSCn or immediately released from the high speed component HOSCn which has a high responsiveness. In this way, the catalyst atmosphere is corrected to the stoichiometric air-fuel ratio, and the conversion efficiency of the catalyst 10 is maintained at a maximum.

If computational errors accumulate, the computed oxygen storage amount shifts from the real oxygen storage amount. However the oxygen storage amount (high speed component HOSCn and low speed component LOSCn) can be reset when the exhaust downstream of the catalyst 10 becomes rich or lean, and any discrepancy between the computed or estimated value and real oxygen storage amount is corrected.

Figure 20:
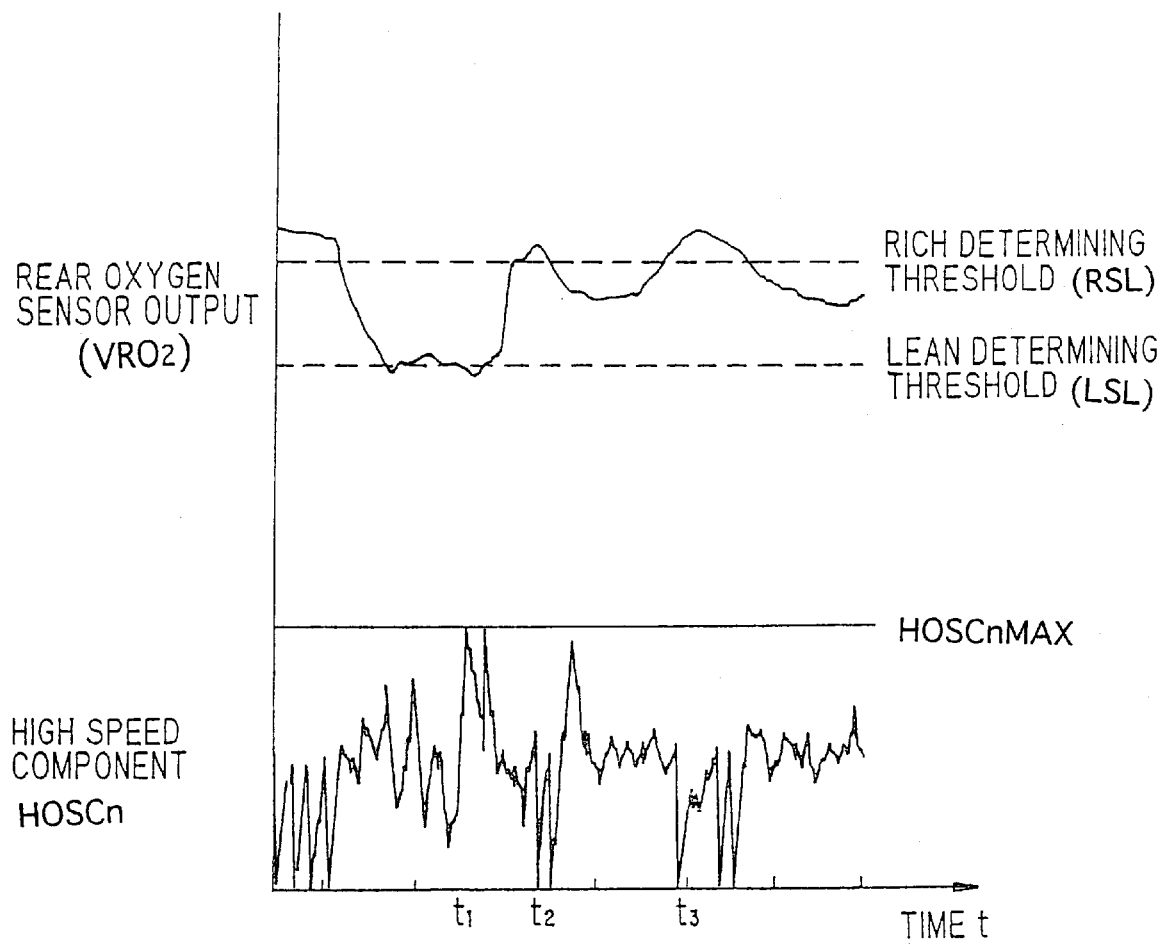
FIG. 20 is a diagram showing how a rear oxygen sensor output and high speed component vary when the oxygen storage amount is controlled to be constant.

FIG. 20 shows how the high speed component HOSCn varies when the above oxygen storage amount constant control is performed.

In this case, at the time t1, the output of the rear oxygen sensor 5 becomes less than the lean determining threshold and lean reset conditions hold, so the high speed component HOSCn is reset to the maximum capacity HOSCnMAX. However, the low speed component LOSCn is not necessarily a maximum at this time, so reset of the low speed component is not performed. The low speed component LOSCn is not shown in FIG. 20.

At times t2, t3, the output of the rear oxygen sensor 5 becomes greater than the rich determining threshold and rich reset conditions hold, so the high speed component HOSCn of the oxygen storage amount is reset to the minimum capacity, i.e., zero. The low speed component LOSCn at this time is also reset to the minimum capacity.

Thus, resetting of the computed or estimated values of the oxygen storage amount is performed when the air-fuel ratio of the exhaust downstream of the catalyst 10 becomes rich or lean. Because the discrepancy from the real oxygen storage amount is corrected, the computational precision of the oxygen storage amount of the catalyst is further enhanced, the precision of the air-fuel ratio control for maintaining the oxygen storage amount constant is increased, and the conversion efficiency of the catalyst is maintained at a high level.

Third Embodiment

The construction of the exhaust purification device according to the second embodiment is identical to the construction shown in FIG. 1, but the processing performed by the controller 6 is different. In particular, there is a difference regarding computation or estimation of the oxygen storage amount. In this second embodiment the storage rate of oxygen in the catalyst 10 is determined according to the ratio of the high speed component to the low speed component of the oxygen storage amount. Specifically, whereas in the previous embodiment, the storage rate of the high speed component was a fixed value, in the second embodiment, the storage rate of the high speed component is determined in accordance with the ratio of the high speed component to the low speed component.

The control performed by the controller 6 will be described referring to the flowchart of FIG. 21. The controller 6 performs lambda control when lambda control conditions (predetermined air-fuel ratio control conditions) hold based on a signal from the front A/F sensor 3 upstream of the catalyst 10. Lambda ($\lambda$) control means that an air-fuel ratio feedback correction coefficient $\alpha$ is computed so that the average value of the exhaust air-fuel ratio upstream of the catalyst 10 becomes the stoichiometric air-fuel ratio, and a basic injection amount Tp is corrected by this correction coefficient $\alpha$.

Here, as the sensor 3 upstream of the catalyst 10 is an A/F sensor, the proportional part and integral part may be calculated from:

proportional part=proportional gain$\times\Delta$(A/F), and integral part=integral gain$\times\Sigma\Delta$(A/F), where:

$\Delta$(A/F)=air-fuel ratio deviation (=real exhaust air-fuel ratio−stoichiometric air-fuel ratio), and proportional plus integral control is performed taking the sum of these as $\alpha$=(proportional part+integral part).

Figure 21:
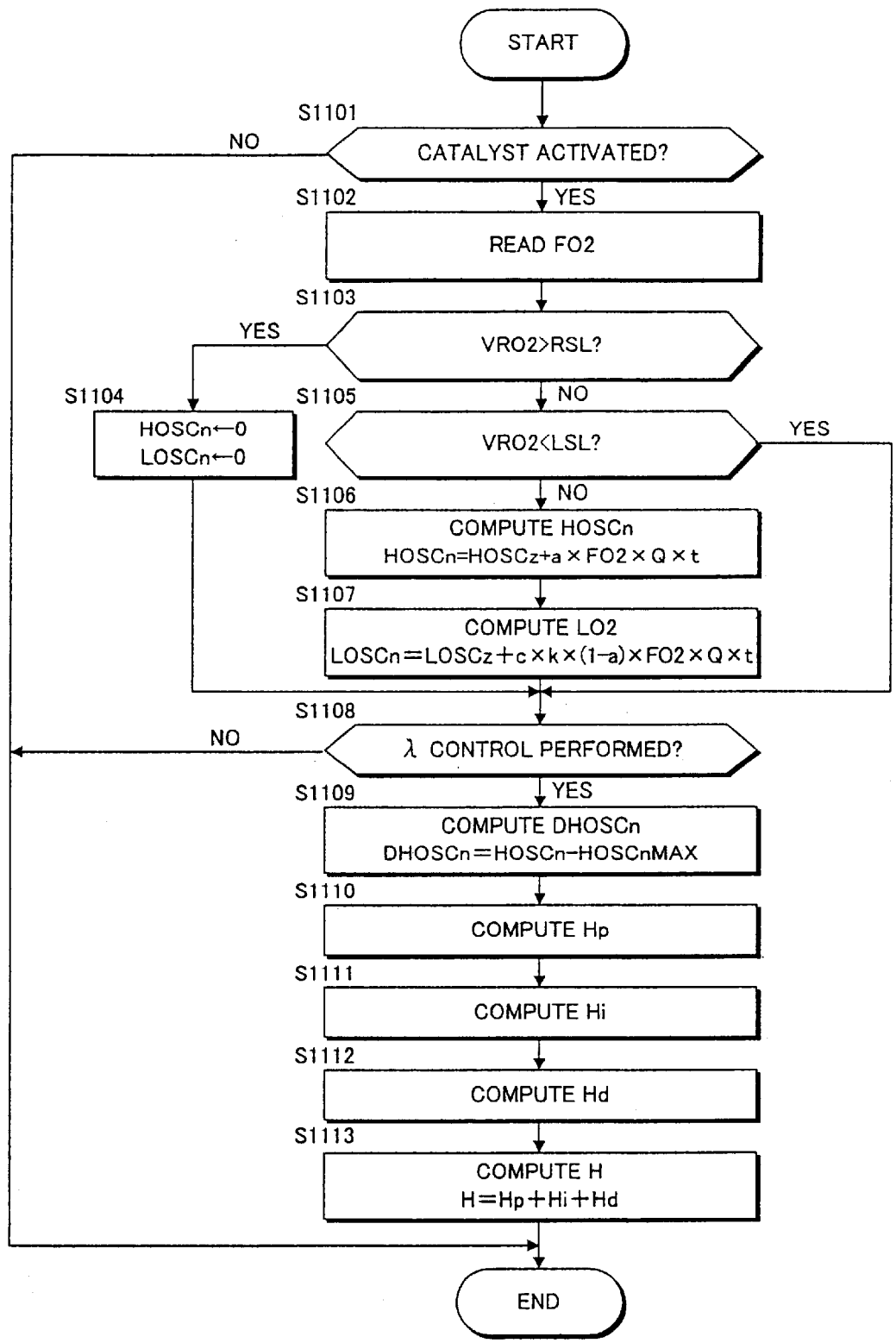
FIG. 21 is a flowchart showing a second embodiment of this invention with the computation of the oxygen storage amount, and a fuel correction control based on the oxygen storage amount.

The processing shown in FIG. 21 is performed at predetermined intervals (e.g., 10 milliseconds) regardless of lambda control. First, in a step S1101, it is determined whether or not the catalyst 10 is activated from conditions such as the cooling water temperature. If the catalyst 10 is not activated, the oxygen storage capacity of the catalyst is not effective, so processing is terminated.

If the catalyst is activated, the routine proceeds to a step S1102, and the excess/deficiency oxygen concentration FO2 of the exhaust is read from the look-up table shown in FIG. 5 based on the output of the front A/F sensor 3.

Here, the excess/deficiency oxygen concentration FO2 of the exhaust is the relative oxygen concentration compared to the oxygen concentration when the air-fuel ratio is stoichiometric, as shown in FIG. 20.

Thus, FO2 is zero when the air-fuel ratio is stoichiometric. When the exhaust air-fuel ratio is lean, the oxygen concentration is higher than the oxygen concentration at the stoichiometric air-fuel ratio, so FO2 is positive. Conversely, when the exhaust air-fuel ratio is rich, the oxygen concentration is lower than the oxygen concentration at the stoichiometric air-fuel ratio, and FO2 is negative.

Here, the range at which the front A/F sensor can perform measurements is limited, as shown in FIG. 20. Therefore, during fuel cut, the fuel ratio is so lean that it lies outside the measurement range. Thus, the air-fuel ratio during fuel cut, and therefore the excess/deficiency oxygen concentration during fuel cut, cannot be calculated based on the front A/F sensor output.

However, the required air-fuel ratio when the air fuel mixture is burnt lies in a predetermined range, and if an A/F sensor covering the required air-fuel ratio range is used, a lean air-fuel ratio outside the measurement range occurs only during fuel cut. Therefore, if an A/F sensor is provided which is at least sufficient to cover the required air-fuel ratio, and the air-fuel ratio is so lean that it lies outside the measurement range, a value corresponding to the atmosphere (=20.90%) is used as the excess/deficiency oxygen concentration FO2. In this way the excess/deficiency oxygen concentration FO2 may be calculated even during fuel cut.

Returning now to FIG. 21, in a step S1103, the output (VRO2) of the rear oxygen sensor 13 downstream of the catalyst is compared with the rich determining threshold RSL. When it is determined that the rear oxygen sensor output VRO2 is greater than the rich determining threshold RSL, i.e., when the exhaust air-fuel ratio is rich, it is assumed that the oxygen storage amount of the catalyst 10 is zero. In this case the catalyst 10 is no longer maintaining the air-fuel ratio downstream of the catalyst at the stoichiometric air-fuel ratio, so the routine proceeds to a step S1104. In the step S1104, the high speed component HOSCn and low speed component LOSCn are both reset to zero.

On the other hand, when the rear oxygen sensor output VRO2 is not greater than the rich determining threshold RSL, the routine proceeds to a step S1105, and it is determined whether the rear oxygen sensor output VRO2 is less than the lean determining threshold LSL, i.e., whether the exhaust air-fuel ratio is lean. When it is not lean, i.e., and the exhaust air-fuel ratio downstream of the catalyst is equal to the stoichiometric air-fuel ratio, it is assumed that the oxygen due to the fluctuation of the exhaust air-fuel ratio upstream of the catalyst 10 is being absorbed by the catalyst, and the routine proceeds to steps S1106, S1107.

Here, the routine proceeds to the steps S1106, S1107 regardless of whether lambda control is being performed or not, but in both cases, the exhaust air-fuel ratio downstream of the catalyst 10 is the stoichiometric air-fuel ratio.

In the step S1106, the high speed component HOSCn is computed by the following equation (19):

$$HOSCn=HOSCz+a\times FO2\times Q\times t \qquad (19)$$

where:

HOSCz=calculated value of the high speed component on the immediately preceding occasion, a=coefficient indicating the oxygen storage rate or release rate of the high speed component, FO2=excess/deficiency oxygen concentration, Q=exhaust gas flow rate (represented by intake air flow rate), and t=cycle time (10 milliseconds).

FO2$\times$Q$\times$t in the second term on the right of equation (7) is the excess/deficiency oxygen amount in unit cycle time (i.e., O2/N). The oxygen amount stored or released as the high speed component in unit cycle time is computed by multiplying by the coefficient a which indicates the oxygen storage rate or release rate. The high speed component of the oxygen storage amount is then calculated by adding this to the immediately preceding value HOSCz of the high speed component.

The second term on the right-hand side of equation (19), includes the excess/deficiency oxygen amount in unit cycle time, FO2×Q×t. The excess/deficiency amount of oxygen is centered at the oxygen amount at the stoichiometric air-fuel ratio. In other words, when oxygen is in excess, the second term on the right-hand side of equation (19) represents the oxygen amount stored in unit cycle time as the high speed component, and when oxygen is deficient, the second term on the right-hand side of equation (19) represents the oxygen amount released in unit cycle time from the high speed component. The coefficient a in this second term determines the rate of oxygen storage when oxygen is in excess, or the rate of oxygen release when oxygen is deficient.

In the step S1107, the low speed component LOSCn of the oxygen storage amount is computed based on the reaction rate of oxygen storage. Here, if the oxygen storage reaction in the oxygen storage material is $$R+O_2 \to RO_2,$$

where:
R=the substance (e.g. cerium oxide) which absorbs oxygen by chemical combination, the reaction rate k is $$k=[R]\times[O_2]/[RO_2] \qquad (20)$$

where:
[R]=amount of substance R,
[$O_2$]=excess oxygen concentration, and
[$RO_2$]=low speed component of the oxygen storage amount.

The oxygen storage reaction rate is directly proportional to the excess oxygen concentration ([$O_2$]). The rate is also directly proportional to the difference between the amount ([R]) of substance storing oxygen, i.e. the maximum capacity LOSCnMAX of the low speed component, and the low speed component, LOSCz of the oxygen storage amount. The rate is inversely proportional to the low speed component ([$RO_2$]) of the current oxygen storage amount. Therefore, the reaction rate k may be represented by the following equation (21):

$$k=d\times FO2\times(LOSCnMAX-LOSCZ)/LOSCz \qquad (21)$$

where d=reaction rate coefficient.

Using this reaction rate k (k≦1), the low speed component LOSCn of the oxygen storage amount is computed by the following equation (21):

$$LOSCn=LOSCz+c\times k\times(FO2\times Q\times t-a\times FO2\times Q\times t) \qquad (21)$$

where:
LOSCz=the value of the low speed component calculated on the immediately preceding occasion,
c=constant,
Q=exhaust gas flow rate (represented by intake air flow rate), and
t=cycle time (10 milliseconds).

The reaction coefficient k in the above may simply be a constant value. Here, FO2×Q×t−a×FO2×Q×t in the second term on the right-hand side of equation (21), is the excess/deficiency oxygen amount in unit cycle time which overflows to the low speed component. Thus, the term FO2×Q× t−a×FO2×Q×t in equation (21) is similar to FO2×Q×t in the second term on the right-hand side of equation (19). By multiplying this by a constant c×k which determines the rate of oxygen storage or oxygen release, the oxygen amount stored by the oxygen storage material or released from the oxygen storage material in unit cycle time is computed. By adding the second term to the immediately preceding value LOSCz, the low speed component of the oxygen storage amount is found.

a×FO2×Q×t is the oxygen amount released from the high speed component in unit cycle time. FO2×Q×t is the excess/deficiency oxygen amount in unit cycle time. The reason why the oxygen amount stored/released as the low speed component in unit cycle time is computed based on the difference between a×FO2×Q×t and FO2×Q×t in equation (21), is that although it is believed that oxygen storage by the noble metal and oxygen storage material take place independently, it is believed that oxygen storage by the noble metal occurs preferentially compared to oxygen storage by the oxygen storage material.

When the exhaust gas downstream of the catalyst is lean in the step S1105, the steps S1106, S1107 are skipped, and the routine proceeds to a step S1108.

In the step S1108, it is determined whether or not lambda control is being performed. As is known, lambda control begins when the front A/F sensor 4 upstream of the catalyst is activated. Lambda control is also stopped during a fuel-cut or when the engine is operated under a high load.

If lambda control is being performed, the routine proceeds to PID control in a step S1109 and subsequent steps, and when lambda control is not being performed, the step S1109 and subsequent steps are not executed. The computation of the high speed component HOSCn is always performed once the catalyst has been activated. However, feedback control which controls the high speed component HOSCn to coincide with a target value, i.e., air-fuel ratio control is performed so that the high speed component coincides with a predetermined target value, is limited to the case when lambda control is being performed.

In the step S1109, there is calculated a difference (deviation DHOSCn) between the high speed component HOSCn of the oxygen storage amount and its target value, for example, ½ the maximum capacity HOSCnMAX of the high speed component from the equation (22):

$$DHOSCn=HOSCn-HOSCnMAX/2 \qquad (22)$$

In steps S1110, S1111 and S1112, a proportional part Hp, integral part Hi and differential part Hd of the feedback amount H are respectively computed from the equations:

Hp=proportional gain×DHOSCn,
Hi=integral gain×ΣDHOSCn,
Hd=differential gain×(DHOSCn−DHOSCZ)/t, where:
t=cycle time (10 milliseconds).

A value obtained by adding Hp, Hi and Hd is set to a fuel correction amount H (feedback amount) in a step S1113, and the processing of FIG. 21 is terminated.

The aforesaid maximum capacity HOSCnMAX of the high speed component is an experimentally determined fixed value.

Using the fuel correction amount H thus obtained, a fuel injection pulse width Ti during a sequential injection is computed by, for example, the equation (23):

$$Ti = Tp \times TYFBYA \times \alpha \times H \times 2 \times Ts \qquad (23)$$

where:
Tp=basic injection pulse width,
TFBYA=target equivalent ratio,
$\alpha$=air-fuel ratio feedback correction coefficient, and
Ts=injection pulse width correction.

The fuel injection valve 7 in FIG. 1 opens for the time Ti at a predetermined injection timing once for every two engine rotations per cylinder, and fuel is injected into the air intake passage 8.

Here, Tp, TFBYA, $\alpha$ and Ts on the right-hand side of equation (23) are identical to the prior art, for example, $\alpha$ is 1.0 during fuel cut and TFBYA is 1.0 during lambda control. Ts is an injection pulse width correction according to a battery voltage.

Next, the setting of the aforesaid coefficient a will be described referring to the flowchart of FIG. 22. This flowchart is executed at a predetermined interval, for example, 10 milliseconds.

Figure 22:
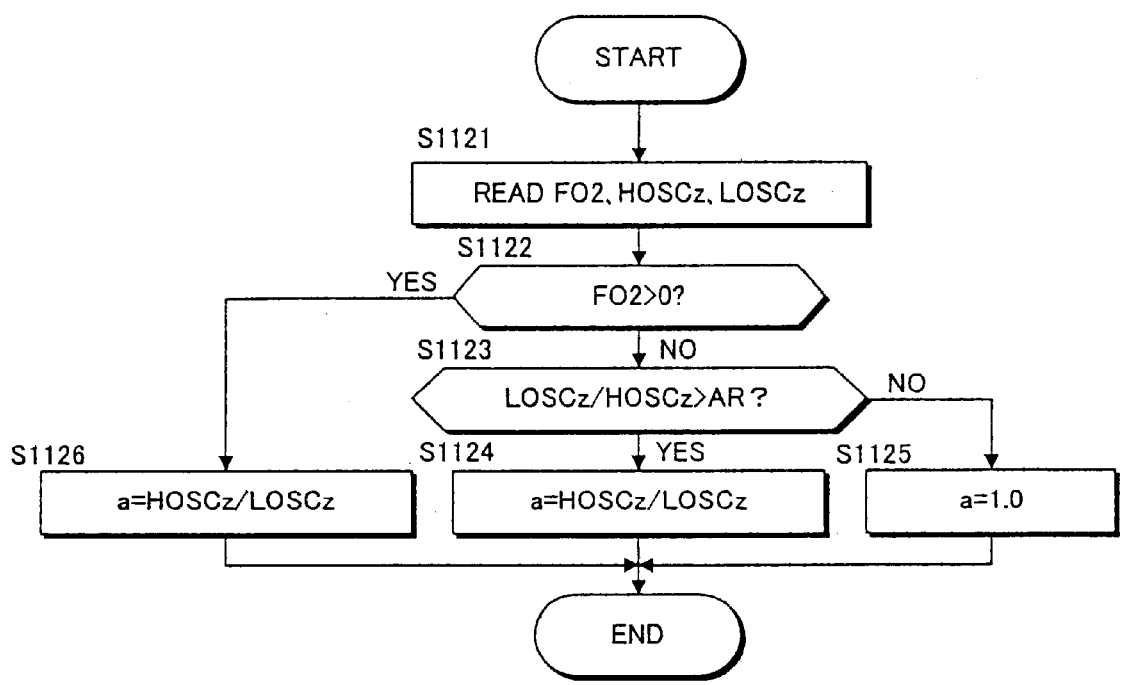

In FIG. 22, in a step S1121, the excess/deficiency oxygen concentration FO2 upstream of the catalyst 10, the immediately preceding value HOSCz of the high speed component and the immediately preceding value LOSCz of the low speed component are read. After the processing of FIG. 21 has been performed for the first time, the values of HOSCn, LOSCn are respectively set to HOSCz, LOSCz as preparation for the second processing step. Therefore, steps S1123 or S1124 of FIG. 22 cannot be performed before the processing of FIG. 21 is performed for the first time. When the processing of FIG. 21 is performed for the first time, predetermined initial values are substituted for HOSCz and LOSCz.

In the step S1122, the excess/deficiency oxygen concentration FO2 is compared with zero. When FO2 is larger than zero, it is determined that oxygen is being released and the routine proceeds to the step S1123. In the step S1123, LOSCz/HOSCz, the ratio of the low speed component to the high speed component of the oxygen storage amount, is compared with a predetermined value (threshold value) AR (e.g., AR=10). When the ratio LOSCz/HOSCz exceeds the predetermined value AR, the routine proceeds to the step S1124, and HOSCz/LOSCz is substituted in the constant a as the rate of oxygen release from the high speed component.

Here, the reason why HOSCz/LOSCz is used as the oxygen release rate from the high speed component is as follows.

When the noble metal or oxygen storage material is used alone, the oxygen release rate depends on the excess/deficiency oxygen concentration FO2 and the partial pressure of the stored oxygen in the noble metal or oxygen storage material. The oxygen storage amount, and the final oxygen release rate of each component (noble metal and oxygen storage material) when both the noble metal and oxygen storage material are present is determined by the ratio of the two components. In other words, the oxygen release rate from the high speed component is directly proportional to HOSCz/LOSCz.

The maximum capacity of the low speed component is approximately 5 to 10 times larger than the maximum capacity of the high speed component, so HOSCz/LOSCz in the step S1124 is a number approximately equal to $\frac{1}{10}$ (value<1.0).

The reason why LOSCz/HOSCz is compared with the predetermined value in the step S1123 instead of HOSCz/LOSCz is because this value is larger and easier to compare. It will of course be understood that HOSCz/LOSCz may also be used.

When LOSCz/HOSCz is less than the predetermined value AR, the routine proceeds from the step S1123 to a step S1125, and the coefficient a is set to 1.0. Here, if LOSCz/HOSCz is less than the predetermined value AR, it means that the sum of the oxygen release amounts in unit cycle time from the noble metal and oxygen storage material (computed values) is larger than the oxygen amount actually released from the catalyst, and does not express the real state. In this case, HOSCz/LOSCz is no longer used as the rate of oxygen released from the high speed component. Instead, it is considered that oxygen is released only as the high speed component, and the oxygen release rate for the high speed component at this time (i.e., 1.0) is substituted for the coefficient a. The oxygen release rate for the high speed component at this time is a maximum.

FIG. 23A shows how the exhaust air-fuel ratio varies before and after the catalyst 10 when the air-fuel ratio of the exhaust flowing into the catalyst 10 changes from lean to rich. FIGS. 23A and 23C show how the oxygen storage amount varies when the air fuel ratio of the exhaust flowing into the catalyst 10 changes from rich to lean.

In this case, in the controller 6, the computation is performed assuming that the amount of oxygen a×FO2×Q×t is released in unit cycle time from the high speed component as shown in FIG. 23B and the amount of oxygen c×k×(FO2×Q×t−a×FO2×Q×t) is released in unit cycle time from the low speed component as shown in FIG. 23C. It may be that the sum of the two computed values is larger than the oxygen amount actually released from the catalyst computed from an air-fuel ratio difference C shown in FIG. 23A, such as when there is a restoration from fuel cut. In this case, the oxygen release rate for the high speed component is set ignoring the amount of oxygen released from the low speed component.

Returning to FIG. 22, when FO2 is less than zero, it is determined that oxygen is being stored, and the routine proceeds to a step S1126. In the step S1126, HOSCz/LOSCz is substituted in the coefficient a as the rate of oxygen storage for the high speed component, as in the step S1124.

In the first embodiment, it was assumed that during storage, all of the oxygen was stored as the high speed component until the high speed component reached maximum capacity. However, in practice, not all the oxygen flowing into the catalyst is stored as the high speed component even if the high speed component has not yet reached maximum capacity.

Thus, if the oxygen release rate is computed based on the ratio of the high speed component to the low speed component not only when oxygen is released but also when it is stored as in this embodiment, the high speed component can be computed with a still higher precision. The part of the oxygen which was not stored as the high speed component is stored as the low speed component, and the remainder is released downstream of the catalyst.

Thus, in this embodiment, by performing the computation separately for the high speed component HOSCn of the oxygen storage amount of the catalyst which is stored/released quickly, and the low speed component LOSCn of the oxygen storage amount of the catalyst which is stored/released slowly, the oxygen release rate for the high speed component can be precisely calculated based on the ratio HOSCz/LOSCz of the high speed component to the low speed component. The precision of computing the high speed component of the oxygen storage amount can therefore be improved.

When oxygen is released from the catalyst, and LOSCz/HOSCz, the ratio of the low speed component and high speed component of the oxygen storage amount, is less than the predetermined value (threshold value), it may occur that the sum of the oxygen release amounts for both components calculated by the computation is larger than the oxygen amount which is actually released from the catalyst. In this case, the real state is not represented. In this case, the rate of oxygen release for the high speed component is set ignoring the low speed component, and the real state can be better approximated.

When oxygen is being stored, although oxygen is stored separately in the noble metal and oxygen storage material, the computation, which presumes that oxygen is first removed from the exhaust gas by the noble metal and the remainder of the oxygen is then removed by the oxygen storage material, is believed to match the actual situation. The same is true for release of oxygen. Therefore, according to this embodiment, the oxygen storage amount or oxygen release amount (a×FO2×Q×t) in the predetermined t is estimated for the noble metal based on the excess/deficiency oxygen amount (FO2×Q×t) in the predetermined time t. The oxygen storage amount or oxygen release amount in the predetermined time is then computed or estimated for the oxygen storage material based on the remaining value (FO2×Q×t−a×FO2×Q×t). The remaining value is obtained by subtracting this computed oxygen storage/release amount for a predetermined time for the high speed component from the excess/deficiency oxygen amount for a predetermined time. In this way, a precise estimation can be performed for each component.

The high speed component HOSCn is computed and the air-fuel ratio is controlled so that HO2 becomes the predetermined target value, for example, ½ of HOSCnMAX. In this way convergence to the target value is rapid, and the effect of the low speed component, which does not contribute to exhaust performance in a short time, can therefore be ignored.

The oxygen storage amount or oxygen release amount for a predetermined time was computed or estimated for the low speed component based on the value of (FO2×Q×t×a×FO2×Q×t) obtained by subtracting the oxygen storage/release amount for a predetermined time for the high speed component from the excess/deficiency oxygen amount for a predetermined time. However, the oxygen storage amount or oxygen release amount for a predetermined time may alternatively be computed for the low speed component based on the excess/deficiency oxygen amount (FO2×Q×t) in the predetermined time.

The contents of Japanese Patent Application P2000-38677 filed in Japan on Feb. 16, 2000, on which this disclosure and the claim to priority is based, are hereby incorporated by reference. The contents of Japanese Patent Applications P2000-34046 (filed Feb. 10, 2000) and P2000-26284 (filed Feb. 3, 2000) along with the content of copending U.S. patent application entitled Exhaust Gas Purification Device (Attorney Docket No. 040356/0347), are also incorporated herein by reference Although the invention has been described above with reference to only a limited number of embodiments, the scope thereof is limited only by the appended claims inasmuch as the various modifications and variations that are possible will be readily within the purview of those skilled in the art to the which invention pertains, given the above disclosure.

For example, in the above embodiment, a catalyst stored in a catalytic converter 10 is provided with an oxygen storage material and oxygen was stored by a catalyst having fast and slow storage characteristics as shown in FIG. 2. However, when this invention is applied to a catalytic converter which does not employ an oxygen storage material, it is still possible to increase the estimation accuracy of the oxygen storage capacity HOSCy of the catalyst by applying the techniques disclosed herein.

Industrial Field of Application

As described above, this invention effectively increases the accuracy of estimations of the oxygen storage capacity of an engine exhaust gas purifying catalyst, thereby enabling accurate control of the oxygen concentration of a gaseous environment of the catalyst. This of course enables effective engine exhaust emission control in a manner which is beneficial to the environment.

What is claimed is:

1. An exhaust purification arrangement for an engine, comprising:
    a catalyst provided in an exhaust passage of the engine;
    a front sensor which detects an excess oxygen concentration of oxygen flowing into the catalyst; and
    a microprocessor programmed to:
        estimate a first amount of oxygen stored in the catalyst, the first amount estimated to be stored at a first rate;
        estimate a second amount of oxygen stored in the catalyst;
        wherein the first rate is estimated based on the excess oxygen concentration and a relationship between the first amount and the second amount; and
        control an air/fuel ratio of the engine based on an average of the first and second amounts.

2. A method of controlling an air-fuel ratio of an engine having a catalytic converter disposed in an exhaust gas passage connected to the engine, the catalytic converter storing and releasing oxygen and having an oxygen saturated condition and a completely oxygen depleted condition, comprising steps of:
    estimating a first storage capacity of the catalytic converter by integrating an excessive oxygen flow rate entering the catalytic converter over a first time period from the completely oxygen depleted condition to the oxygen saturated condition;
    estimating a second storage capacity by integrating an oxygen desorption flow rate over a second time period from the oxygen saturated condition to the completely oxygen depleted condition;
    determining a target value for an oxygen storage level within the catalytic converter based on a mathematical result derived using the first storage capacity and the second storage capacity; and
    controlling an air-fuel ratio of an exhaust gas supplied to the catalytic converter to maintain the oxygen storage level within the catalytic converter at the determined target value.

3. The method of controlling an air-fuel ratio as set forth in claim 2, wherein the step of determining a target value comprises steps of:
    calculating an average of the first and second storage capacities; and
    applying a value, derived using the average, as the target value for the oxygen storage level.

4. The method of controlling an air-fuel ratio as set forth in claim 2, wherein the first time period is a period wherein a signal of a sensor located downstream of the catalytic converter is in a stoichiometric range and the air-fuel ratio of the engine is lean, and wherein the second time period is a period wherein the signal is in the stoichiometric range and the air-fuel ratio of the engine is rich.

5. The method of controlling an air-fuel ratio as set forth in claim 2, wherein the first storage capacity is estimated at least one time between an engine start and an engine stop, and the second storage capacity is estimated at least one time between the engine start and the engine stop.

6. A method of controlling the air-fuel ratio of an atmosphere in a catalytic converter which is operatively connected with an internal combustion engine, comprising steps of:

storing oxygen on a first material in the catalytic converter which adsorbs and releases oxygen rapidly;

storing oxygen on a second material in the catalytic converter which adsorbs and releases oxygen more slowly than the first material; and controlling the air-fuel ratio of the exhaust gas entering the catalytic converter to control the amount of oxygen which is adsorbed on the first material to a predicted predetermined amount which is less than the maximum amount of oxygen which can be adsorbed onto the first material;

checking the predicted predetermined amount by controlling the air-fuel ratio of the exhaust gas supplied into the catalytic converter so that the first material becomes saturated with oxygen;

controlling the amount of oxygen in the exhaust gas supplied to the catalytic converter so that oxygen is released from the first material;

detecting a first period required for the oxygen storage status of the first material to go from full saturation to total depletion;

controlling the amount of oxygen in the exhaust gas supplied to the catalytic converter so that oxygen is adsorbed onto the first material;

detecting a second period required for the oxygen storage status to go from total depletion to full saturation;

detecting the respective mass flow amount of oxygen during the first and second periods and determining a first amount of oxygen released and a second amount of oxygen adsorbed;

comparing the first and second amounts; and determining a target oxygen storage value based on the comparison of the first and second amounts.

7. An apparatus for controlling an air-fuel ratio of an engine having a catalytic converter disposed in an exhaust gas passage connected to the engine, the catalytic converter storing and releasing oxygen and having an oxygen saturated condition and a completely oxygen depleted condition, comprising:

means for estimating a first storage capacity of the catalytic converter by integrating an excessive oxygen flow rate entering the catalytic converter over a first time period from the completely oxygen depleted condition to the oxygen saturated condition;

means for estimating a second storage capacity by integrating an oxygen desorption flow rate over a second time period from the oxygen saturated condition to the completely oxygen depleted condition;

means for determining a target value for an oxygen storage level within the catalytic converter based on a mathematical result derived using the first storage capacity and the second storage capacity; and means for controlling an air-fuel ratio of an exhaust gas supplied to the catalytic converter to maintain the oxygen storage level within the catalytic converter at the determined target value.

8. The apparatus for controlling an air-fuel ratio as set forth in claim 7, wherein the target value determining means includes:

means for calculating an average of the first and second storage capacities; and means for applying a value, derived using the average, as the target value for the oxygen storage level.

9. The apparatus for controlling an air-fuel ratio as set forth in claim 7, wherein the first time period is a period wherein a signal of a sensor located downstream of the catalytic converter is in a stoichiometric range and the air-fuel ratio of the engine is lean, and wherein the second time period is a period wherein the signal is in the stoichiometric range and the air-fuel ratio of the engine is rich.

10. The apparatus for controlling an air-fuel ratio as set forth in claim 7, wherein the first storage capacity is estimated at least one time between an engine start and an engine stop, and the second storage capacity is estimated at least one time between the engine start and the engine stop.

11. An apparatus for controlling the air-fuel ratio of an atmosphere in a catalytic converter which is operatively connected with an internal combustion engine, comprising:

means for storing oxygen on a first material in the catalytic converter which adsorbs and releases oxygen rapidly;

means for storing oxygen on a second material in the catalytic converter which adsorbs and releases oxygen more slowly than the first material; and means for controlling the air-fuel ratio of the exhaust gas entering the catalytic converter to control the amount of oxygen which is adsorbed on the first material to a predicted predetermined amount which is less than the maximum amount of oxygen which can be adsorbed onto the first material;

means for checking the predicted predetermined amount by controlling the air-fuel ratio of the exhaust gas supplied into the catalytic converter so that the first material becomes saturated with oxygen;

means for controlling the amount of oxygen in the exhaust gas supplied to the catalytic converter so that oxygen is released from the first material;

means for detecting a first period required for the oxygen storage status of the first material to go from full saturation to total depletion;

means for controlling the amount of oxygen in the exhaust gas supplied to the catalytic converter so that oxygen is adsorbed onto the first material;

means for detecting a second period required for the oxygen storage status to go from total depletion to full saturation;

means for detecting the respective mass flow amount of oxygen during the first and second periods and determining a first amount of oxygen released and a second amount of oxygen adsorbed;

means for comparing the first and second amounts; and means for determining a target oxygen storage value based on the comparison of the first and second amounts.

12. An exhaust emission control arrangement for an internal combustion engine having a fuel supply mechanism and an exhaust passage, comprising:

a catalytic converter disposed in the exhaust gas passage, the catalytic converter housing a three-way catalyst including a first material which adsorbs oxygen quickly and a second material which stores oxygen at a rate slower than the first material;

a first oxygen sensor which detects an oxygen concentration of exhaust gas upstream of the catalyst;

a second oxygen sensor which detects an oxygen concentration of exhaust gas downstream of the catalyst; and a microprocessor programmed to:

calculate, using the upstream oxygen concentration, an excess/deficiency oxygen concentration in exhaust gas upstream of the catalyst with respect to a stoichiometric oxygen concentration;

calculate an oxygen storage amount of at least the first material of the catalyst based on the excess/deficiency oxygen concentration;

calculate a specific period oxygen storage amount of the catalyst during a period in which the upstream oxygen concentration is higher than the stoichiometric concentration while the downstream oxygen concentration is in a predetermined concentration range including the stoichiometric oxygen concentration;

calculate a specific period oxygen release amount of the first material during a period in which the upstream oxygen concentration is lower than the stoichiometric concentration while the downstream oxygen concentration is in the predetermined concentration range;

sample a specific period oxygen storage amount as a maximum oxygen storage amount at a time at which the downstream oxygen concentration becomes greater than the predetermined concentration range;

sample a specific period oxygen release amount as a maximum oxygen release amount at a time at which the downstream oxygen concentration becomes smaller than the predetermined concentration range;

calculate an average value of the maximum oxygen storage amount and the maximum oxygen release amount;

determine a target value of the oxygen storage amount which has a predetermined relationship with the average value; and control a fuel supply amount of the fuel supply mechanism to maintain the oxygen storage amount of the first material at the target value.

13. The exhaust emission control arrangement as defined in claim 12, wherein the first material is a precious metal which in itself rapidly adsorbs and desorbs oxygen, wherein the second material is an oxygen storage material which in itself stores and releases oxygen at a lower rate than the precious metal, and wherein the first and second materials, in the presence of the other, respectively exhibit a common oxygen release characteristic.

14. The exhaust emission control arrangement as defined in claim 12, wherein the first oxygen sensor comprises an exhaust gas oxygen sensor having an output which varies essentially proportionally to an oxygen concentration in exhaust gas, and wherein the second oxygen sensor comprises an oxygen sensor which has an output which varies in the region of the stoichiometric oxygen concentration.

15. The exhaust emission control arrangement as defined in claim 12, wherein the controller further comprises a sensor which detects an exhaust gas flow amount in the exhaust passage; and the microprocessor is further programmed to calculate respectively the specific period oxygen release amount in unit time and the specific period oxygen storage amount in unit time based on a multiple of the exhaust gas flow amount and the excess/deficiency oxygen concentration, calculate the specific period oxygen storage amount by accumulating the specific period oxygen storage amount in unit time, and calculate the specific period oxygen release amount by accumulating the specific period oxygen release amount in unit time.

16. The exhaust emission control arrangement as defined in claim 15, wherein the microprocessor is further programmed to calculate respectively the specific period oxygen release amount in unit time and the specific period oxygen storage amount in unit time by multiplying a fixed coefficient which has a value less than one by a multiple of the exhaust gas flow amount and the excess/deficiency oxygen concentration.

17. The exhaust emission control arrangement as defined in claim 15, wherein the microprocessor is further programmed to reset the specific period oxygen storage amount to a value of zero after sampling the maximum catalyst oxygen storage amount; and reset the specific period oxygen release amount to a value of zero after sampling the maximum catalyst oxygen release amount.

18. The exhaust emission control arrangement as defined in claim 12, wherein the controller further comprises a sensor which detects a temperature of the catalyst, and the microprocessor is further programmed to prohibit the calculation of the specific period oxygen release amount and the calculation of the specific period oxygen storage amount, when the temperature is less than a predetermined temperature.

19. The exhaust emission control arrangement as defined in claim 12, wherein the microprocessor is further programmed to correct an output of the first oxygen sensor when the upstream oxygen concentration deviates from a predetermined range for a predetermined period, count up occurrences of the correction, and prohibit a sampling of the maximum catalyst storage amount and a sampling of the maximum catalyst release amount, when the occurrences reach a predetermined number of times.

20. The exhaust emission control arrangement as defined in claim 12, wherein the microprocessor is further programmed to correct an output of the first oxygen sensor when the upstream oxygen concentration deviates from a predetermined range for a predetermined period, accumulate a value applied for correction of the output of the first oxygen sensor, and prohibit a sampling of the maximum catalyst storage amount and a sampling of the maximum catalyst release amount, when an accumulated value reaches a predetermined value.

21. The exhaust emission control arrangement as defined in claim 15, wherein the microprocessor is further programmed to calculate the oxygen storage amount in unit time by multiplying a fixed coefficient which has a value less than one by a multiple of the exhaust gas flow amount and the excess/deficiency oxygen concentration.

22. The exhaust emission control arrangement as defined in claim 12, wherein the microprocessor is further programmed to determine an oxygen storage capacity of the catalyst based on the average value, and determine the target value to one half the value of the oxygen storage capacity.

23. The exhaust emission control arrangement as defined in claim 12, wherein the microprocessor is further programmed to determine the fuel supply amount by a proportional-integral calculation based on a difference of the target value and the oxygen storage amount of the catalyst.

24. An exhaust emission control arrangement for an engine, the engine comprising a fuel supply mechanism and an exhaust passage, the controller comprising;

a catalytic converter disposed in the exhaust gas passage, the catalytic converter storing a three-way catalyst;

means for detecting an oxygen concentration of exhaust gas upstream of the catalyst as an upstream oxygen concentration;

means for detecting an oxygen concentration of exhaust gas downstream of the catalyst as a downstream oxygen concentration;

means for calculating, from the upstream oxygen concentration, an excess/deficiency oxygen concentration in exhaust gas upstream of the catalyst with respect to a stoichiometric oxygen concentration which corresponds to a stoichiometric air-fuel ratio of a fuel mixture provided to the engine;

means for calculating an oxygen storage amount of the catalyst based on the excess/deficiency oxygen concentration;

means for calculating a specific period oxygen storage amount of the catalyst during a period in which the upstream oxygen concentration is higher than the stoichiometric concentration while the downstream oxygen concentration is in a predetermined concentration range including the stoichiometric oxygen concentration;

means for calculating a specific period oxygen release amount of the catalyst during a period in which the upstream oxygen concentration is lower than the stoichiometric concentration while the downstream oxygen concentration is in the predetermined concentration range;

means for sampling a specific period oxygen storage amount as a maximum oxygen storage amount at a time at which the downstream oxygen concentration becomes greater than the predetermined concentration range;

means for sampling a specific period oxygen release amount as a maximum oxygen release amount at a time at which the downstream oxygen concentration becomes smaller than the predetermined concentration range;

means for calculating an average value of the maximum oxygen storage amount and the maximum oxygen release amount;

means for determining a target value of the oxygen storage amount based on the average value; and means for controlling a fuel supply amount of the fuel supply mechanism to cause the oxygen storage amount of the catalyst to coincide with the target value.

25. A method for controlling an exhaust emission of an engine, the engine comprising a fuel supply mechanism, an exhaust passage and a catalytic converter disposed in the exhaust gas passage, the catalytic converter storing a three-way catalyst, the method comprising;

detecting an oxygen concentration of exhaust gas upstream of the catalyst as an upstream oxygen concentration;

detecting an oxygen concentration of exhaust gas downstream of the catalyst as a downstream oxygen concentration;

calculating, from the upstream oxygen concentration, an excess/deficiency oxygen concentration in exhaust gas upstream of the catalyst with respect to a stoichiometric oxygen concentration which corresponds to a stoichiometric air-fuel ratio of a fuel mixture provided to the engine;

calculating an oxygen storage amount of the catalyst based on the excess/deficiency oxygen concentration;

calculating a specific period oxygen storage amount of the catalyst during a period in which the upstream oxygen concentration is higher than the stoichiometric concentration while the downstream oxygen concentration is in a predetermined concentration range including the stoichiometric oxygen concentration;

calculating a specific period oxygen release amount of the catalyst during a period in which the upstream oxygen concentration is lower than the stoichiometric concentration while the downstream oxygen concentration is in the predetermined concentration range;

sampling a specific period oxygen storage amount as a maximum oxygen storage amount at a time at which the downstream oxygen concentration becomes greater than the predetermined concentration range;

sampling a specific period oxygen release amount as a maximum oxygen release amount at a time at which the downstream oxygen concentration becomes smaller than the predetermined concentration range;

calculating an average value of the maximum oxygen storage amount and the maximum oxygen release amount;

determining a target value of the oxygen storage amount based on the average value; and controlling a fuel supply amount of the fuel supply mechanism to cause the oxygen storage amount of the catalyst to coincide with the target value.

26. A method of determining a target oxygen content of a catalyst forming part of an exhaust emission control for an internal combustion engine comprising the steps of:

determining a first maximum amount of oxygen that a catalyst material can rapidly adsorb;

determining a second maximum amount of oxygen that the catalyst material can rapidly release; and averaging the first and second maximum amounts and setting the target oxygen content on a predetermined percentage of the average.

27. A method as set forth in claim 26, further comprising the steps of:

determining a third maximum amount of oxygen that a storage material associated with the catalyst can store; and determining the effect of the oxygen stored in the storage material on the release characteristics of the catalyst material.

28. An arrangement for determining a target oxygen content of a catalyst forming part of an exhaust emission control for an internal combustion engine, comprising:

an apparatus including an air-fuel sensor and a gas flow sensing arrangement for:

determining a first maximum amount of oxygen that a catalyst material can rapidly adsorb;

determining a second maximum amount of oxygen that the catalyst material can rapidly release; and averaging the first and second maximum amounts and setting the target oxygen content on a predetermined percentage of the average.

* * * * *